(12) United States Patent
Ghidini et al.

(10) Patent No.: US 8,149,492 B2
(45) Date of Patent: Apr. 3, 2012

(54) OPTICAL MODULATOR

(75) Inventors: Silvia Ghidini, Milan (IT); Antonio Nespola, Moncalieri (IT)

(73) Assignee: Google Inc., Mountain View, CA (US)

( * ) Notice: Subject to any disclaimer, the term of this patent is extended or adjusted under 35 U.S.C. 154(b) by 872 days.

(21) Appl. No.: 10/593,697

(22) PCT Filed: Mar. 31, 2004

(86) PCT No.: PCT/EP2004/003627
§ 371 (c)(1),
(2), (4) Date: Sep. 9, 2008

(87) PCT Pub. No.: WO2005/096086
PCT Pub. Date: Oct. 13, 2005

(65) Prior Publication Data
US 2009/0003841 A1   Jan. 1, 2009

(51) Int. Cl.
*G02F 1/03* (2006.01)
*G02F 1/01* (2006.01)
*G02F 1/035* (2006.01)

(52) U.S. Cl. ............... 359/245; 359/279; 385/3

(58) Field of Classification Search ............ 359/245, 359/315, 247, 251–252, 254, 108, 237–238, 359/278–279, 290–292, 298, 300–302; 385/1–3, 385/40, 129–132, 5, 8–9
See application file for complete search history.

(56) References Cited

U.S. PATENT DOCUMENTS

| | | | |
|---|---|---|---|
| 5,267,073 A | 11/1993 | Tamburello et al. | |
| 5,309,532 A * | 5/1994 | Chang et al. | 385/3 |
| 5,524,076 A | 6/1996 | Rolland et al. | |
| 5,764,765 A * | 6/1998 | Phoenix et al. | 380/283 |
| 5,778,113 A | 7/1998 | Yu | |
| 5,991,471 A | 11/1999 | Yu | |
| 6,744,546 B2 | 6/2004 | Nakamura et al. | |
| 2002/0085811 A1 * | 7/2002 | Kambe | 385/41 |
| 2004/0008965 A1 * | 1/2004 | Betty | 385/140 |
| 2004/0052491 A1 * | 3/2004 | Otake et al. | 385/131 |

FOREIGN PATENT DOCUMENTS

JP   2001-027746   1/2001

(Continued)

OTHER PUBLICATIONS

Soref et al., "Guided-Wave Intensity Modulators Using Amplitude and Phase Perturbations", Journal of Lightwave Technology, vol. 6, No. 3, pp. 437-444, (1988).
Soref, "Silicon-Based Optoelectronics", Proceedings of the IEEE, vol. 81, No. 12, pp. 1687-1706, (1993).
Heismann et al., "Lithium Niobate Integrated Optics: Selected Contemporary Devices and System Applications", Editor Kaminow et al., Optical Fiber Telecommunications IIIB, ed. Academic Press, San Diego, Chapter 9, pp. 377-404, (1997).

(Continued)

*Primary Examiner* — Dawayne A Pinkney
(74) *Attorney, Agent, or Firm* — Honigman Miller Schwartz and Cohn LLP

(57) ABSTRACT

An optical modulator has an optical splitter for splitting an input light beam into a first and second light beam; a first and a second wave-guide arm connected to the optical splitter for receiving and transmitting therethrough the first and second light beam, respectively, the waveguide arms each including a core region having group IV semiconductor material or a combination of group IV semiconductor materials; an optical combiner connected to the first and second waveguide arm for receiving the first and second light beam and combining them into an output light beam; a first and a second electrode structure associated with the first and second waveguide arm, respectively; and a driving circuit for supplying voltage to the first and second electrode structure. The driving circuit is adapted to supply a first modulation voltage super-imposed to a first bias voltage to the first electrode structure and a second modulation voltage superimposed to a second bias voltage to the second electrode structure.

40 Claims, 15 Drawing Sheets

| | FOREIGN PATENT DOCUMENTS | |
|---|---|---|
| JP | 2001-244885 | 9/2001 |
| JP | 2003-177368 | 6/2003 |
| JP | 2003-258733 | 9/2003 |
| WO | WO 03/036367 | 5/2003 |
| WO | WO 2004/001857 | 12/2003 |

OTHER PUBLICATIONS

Soref et al., "Large Single-Mode Rib Waveguides in GeSi-Si and Si-on-SiO$_2$", Journal of Quantum Electronics, vol. 27, No. 8, pp. 1971-1974, (1991).

* cited by examiner

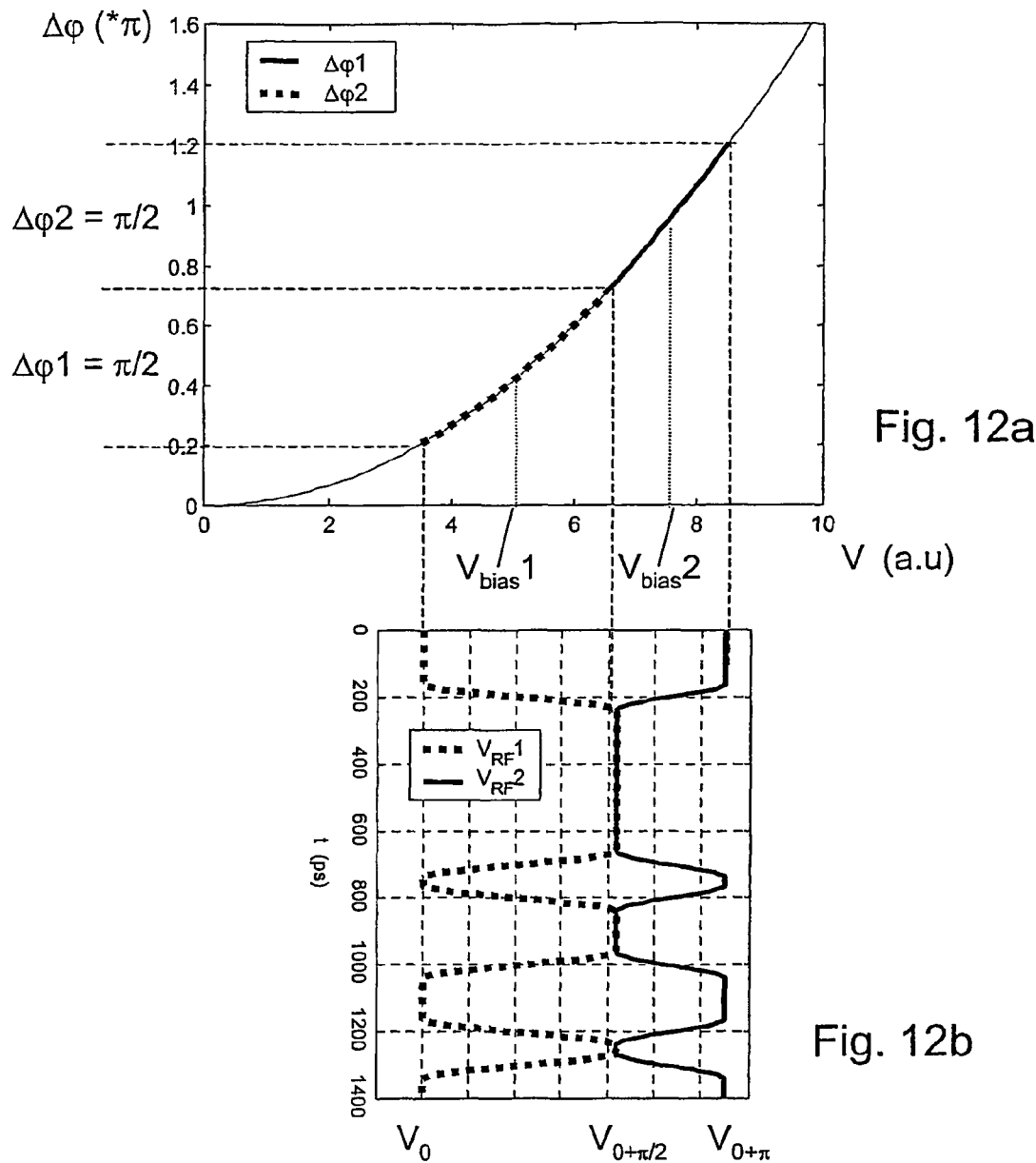

OPTICAL MODULATOR

CROSS REFERENCE TO RELATED APPLICATION

This application is a national phase application based on PCT/EP2004/003627, filed Mar. 31, 2004, the content of which is incorporated herein by reference.

BACKGROUND OF THE INVENTION

1. Field of the Invention

The present invention relates to an optical modulator and a method for modulating the intensity of a light beam.

The present invention also relates to a unit, a transmitting station and an optical communication system comprising the optical modulator.

2. Description of the Related Art

As stated by I. P. Kaminow and T. L. Koch ("Optical fiber telecommunications IIIB", ed. Academic Press, San Diego, 1997, pages 377-404) the earlier approach employed in digital telecommunication systems to encode the information, which is in the form of a digital electrical signal, onto to an optical carrier was direct modulation of the laser. In the typical configuration for direct modulation the electrical signal is combined with a bias current and applied to the terminals of the laser. However, when attempts are made to modulate at data bit rates beyond about 1-2 Gb/s, undesirable optical frequency variations occur, referred to as chirp. These frequency variations causes the lasing frequency to shift thereby broadening the optical spectrum of the transmitted pulses. When combined with the group velocity dispersion of standard single mode silica fibers, the sign and magnitude of the chirp for typical lasers result in an acceleration of the rate at which the pulses spread and interfere as they propagate along the fiber.

In order to overcome this problem, it has been proposed to externally modulate the intensity of a light beam emitted in continuous wave (CW) by a laser through an external optical modulator.

Typically, an optical modulator modulates at a predetermined bit rate the intensity of a light beam under the control of a digital electrical signal carrying the information to be transmitted through an optical communication system. Typically, under the control of the electrical signal, the intensity optical modulator switches a CW light beam on and off so as to obtain a "1" logic state and a "0" logic state, respectively.

Intensity optical modulators based on electro-optical effects are known in the art. These devices comprise a material the optical properties of which can be suitably changed by applying thereto an electrical field.

A Mach-Zehnder optical modulator based on an electro-optical effect is also known in the art. This modulator is provided with a interferometric configuration which converts a phase modulation into an intensity modulation. More in particular, it typically comprises a pair of waveguide arms, typically having equal length, connected between an optical waveguide splitter and an optical waveguide combiner. An input light beam is typically equally split in two light beams by the waveguide splitter, the two light beams from the splitter travel through the respective arm and they are recombined by the waveguide combiner. Electrodes are associated with the waveguide arms. By applying modulation voltage to one or both electrodes the relative phase of the two light beams can be altered through electro-optical effect. When the relative phase shift accumulated between the two light beams at the end of the two waveguide arms is π or an integer odd multiple thereof, the two light beams destructively interfere at the waveguide combiner and a "0" logic state is obtained. By contrast, when the relative phase shift between the two light beams is zero or an integer even multiple of π, the two light beams constructively interfere at the waveguide combiner and a "1" logic state is obtained.

Mach-Zehnder modulators having the two arms fabricated in lithium niobate ($LiNbO_3$) are well known in the art (see, for example, I. P. Kaminow, T. L. Koch, "Optical fiber telecommunications IIIB", ed. Academic Press, San Diego, 1997, pages 377-404). In these modulators the relative phase of the two light beams is altered through the well known electro-optical Pockels effect. More in particular, in these modulators the application of a modulation voltage to one or both electrodes induces—through Pockels effect—a linear variation of the refractive index of lithium niobate thereby altering the optical path of the waveguide arm(s) and, thus, the phase of the light beam(s). In order to reduce the operating voltage, the electrodes of the two waveguide arms are typically driven according to a equal push-pull configuration. That is, they are driven by modulation electric signals that induce in the two arms a variation Δ of the refractive index n which is of the same absolute value |Δn| but opposite in sign (±Δn). In this way, as long as the proper initial conditions are used, when no voltage is applied to the electrodes the relative phase shift accumulated between the two light beams at the end of the two waveguide arms is null and the "1" logic state is obtained. By contrast, when the voltage $+V_{\pi/2}$ is applied to the first arm and the voltage $-V_{\pi/2}$ is applied to the second arm so that the phase shift in the first arm is $+\pi/2$ while the phase shift in the second arm is $-\pi/2$, the relative phase shift accumulated between the two light beams is π and the "0" logic state is obtained. Push-pull dual arm driving condition requires a lower operating voltage than single arm driving condition. Moreover, due to the linearity of the Pockels effect, dual arm driving condition with equal push-pull configuration may give substantially zero chirp.

Richard A. Soref at al. ("Guided-Wave Intensity Modulators Using Amplitude- and Phase Perturbations", Journal of Lightwave Technology, Vol. 6, No. 3, March 1988, pages 437-444) report a theoretical analysis of intensity modulation in coupled waveguide and Mach-Zehnder interferometers. More in particular they explore the use of combined amplitude and phase modulation induced in group IV and III-V semiconductors by electro-optical free-carrier or Franz-Keldysh effect. Moreover, they analyze three types of electro-optic guided-wave modulators: absorbing channel, Mach-Zehnder interferometer and coupled waveguide, wherein only one arm is perturbed in the last two modulators. In case of perturbation in both arms, they state that, unlike push-pull Pockels devices that give $+\Delta\beta$ in one arm and $-\Delta\beta$ in the other (wherein $\beta=2\pi n/\lambda$ is the propagation coefficient), the Franz-Keldysh and charge-controlled devices give the same sign of $\Delta\beta$ in both arms. Hence, in the modulator with two active arms, the phase-velocity mismatch will vanish in the voltage-on-state. This implies that the phase terms will cancel and that only the loss terms will remain.

Mach-Zehnder optical modulators having the two arms fabricated in group III-V materials with multi-quantum wells are also known in the art.

For example, U.S. Pat. No. 5,524,076 discloses a Mach-Zehnder optical modulator fabricated using a group III-V material having multi-quantum wells in which the chirp parameter can be varied by adjusting the optical power splitting ratio between the two arms of the interferometer.

U.S. Pat. No. 5,778,113 discloses a Mach-Zehnder optical modulator fabricated using a group. III-V material having multi-quantum wells which can selectively generate either positive or negative frequency chirp. In fact, as stated in this document, positive frequency chirp affects long haul transmission over non-dispersion shifted fiber. In such situations, controlled levels of negative chirp provided by the optical modulator is advantageous. By contrast, some transmission networks make use of dispersion shifted or dispersion compensating optical fibers in which case negative chirp is not required and in fact it may be more appropriate to provide the data pulses with a slight positive chirp.

A modulator disclosed by U.S. Pat. No. 5,778,113 comprises an asymmetric input Y-junction waveguide coupler, an asymmetric output Y-junction waveguide coupler, a first interferometric arm defining a first optical path and a second interferometric arm defining a second optical path, wherein one of the path length is greater than the other by a distance which generates a fixed phase difference of $\pi$ at the known wavelength. Electrodes are provided on the first and second arms for supplying bias and modulation voltage in push-pull mode to modulate the effective phase difference between the arms. A control electrode is provided on one of the arms for selectively applying a control electric field to selectively modulate the phase difference between the arms. With no electric field on the control electrode a negative frequency chirp is generated and with a control electric field on the arm equal to the field required to generate the fixed phase difference a positive frequency chirp is generated.

In U.S. Pat. No. 5,778,113 it is stated that one significant difference between a III-V Mach-Zehnder modulator and a LiNbO$_3$ Mach-Zehnder modulator is that in the former absorption increases with voltage applied to the arms while absorption is not present in the latter. Moreover, a III-V Mach-Zehnder modulator shows a non-linear phase change as a function of bias voltage.

U.S. Pat. No. 5,991,471 discloses a Mach-Zehnder (MZ) optical modulator formed in a group III-V material having multi quantum wells. The modulator has first and second modulation electrode on respective first and second interferometric arm for supplying bias and modulation voltage in push-pull mode. The two modulation electrodes are of different length, the ratio of the lengths being designed to control the relative bias of the two arms, thereby providing for adjustment and optimization of frequency chirp, in a positive or negative chirp MZ modulator or in a configurable chirp MZ modulator.

The Applicant notes that the Mach-Zehnder structures disclosed by U.S. Pat. No. 5,524,076, U.S. Pat. No. 5,778,113, U.S. Pat. No. 5,991,471 require the presence of asymmetric splitter and asymmetric combiner, means for adjusting the splitting ratio of the asymmetric splitter, arms of different length and/or electrodes of different length. This may reduce the reliability of the device, increase the cost and complicate the production process.

Moreover, group III-V semiconductor materials are not compatible with silicon (Si) processing so that they cannot be integrated on a Si substrate (that is, they cannot grow on a Si substrate).

The issue of creating cost-effective silicon superchips that merge silicon photonics with advanced silicon electronics on a silicon substrate has been raised in the art. Comparing silicon substrates to group III-V platforms, silicon is available at low cost, in larger sizes (20-cm diameter wafers), with a higher degree of crystal perfection, a better native oxide, and superior mechanical and thermal properties (see Richard A. Soref, "*Silicon-Based Optoelectronics*", Proceedings of the IEEE, vol. 81, no. 12, December 1993, pages 1687-1706).

In view of that, there is a need in the art of Si compatible electro-optical components so that they can be integrated on a silicon substrate.

WO 03/036367 discloses an optical modulator fabricated in SiGe and using the Franz-Keldysh effect. According to one embodiment, the modulator comprises a Mach-Zehnder structure with one or both arms made of SiGe. In this document it is stated that the absorption coefficient of the structure can be modified by means of the Franz-Keldysh effect. Because a change in the absorption coefficient will also cause a change in the phase of the light, the structure can be used to modulate light by changing the phase of the light in one or both arms. Because only a small change in absorption is needed, the composition of the waveguide region in the arms will have a SiGe content such that only a small amount of absorption will be induced by Franz-Keldysh effect.

The modulator fabricated in SiGe disclosed by this document is compatible with Si processing. The Applicant notes that the SiGe material has higher attenuation loss (compared, for example to lithium niobate) and a non-linear refractive index variation through Franz-Keldysh effect as a function of applied electric field. The Applicant further notes that due to the high attenuation loss of the SiGe material the optical modulator should be sized so as to limit the overall attenuation loss of the optical modulator. Furthermore, this document does not teach how the frequency chirp of the modulated light beam can be controlled.

As mentioned above, the frequency chirp phenomenon is a critical parameter in an optical transmission system. According to different system conditions, optical pulses having positive chirp, negative chirp or null chirp may be required to be transmitted into the optical communication system. There is, therefore, a need of an optical modulator capable of providing a modulated optical light beam with a desired frequency chirp value.

SUMMARY OF THE INVENTION

The Applicant faced the technical problem of providing an optical modulator which can be integrated on a silicon substrate and having limited overall attenuation loss.

Moreover, the Applicant faced the technical problem of providing an optical modulator capable of providing a modulated optical light beam with a desired frequency chirp value.

The Applicant found that the above mentioned problems can be solved by a Mach-Zehnder structure comprising two waveguide arms in which the core region comprises a group IV semiconductor material, two electrode structures, one for each arm, and a driving circuit for supplying a modulation voltage superimposed to a bias voltage to each electrode structure.

In fact, group IV semiconductor materials are integrable on a silicon substrate.

Moreover, as disclosed in detail below, the two electrode structures, one for each arm, and the driving circuit for supplying a modulation voltage superimposed to a bias voltage to each electrode structure allow to obtain conditions in which the overall phase shift undergone by the light beams in the respective arm is opposite in sign when the optical modulator passes from a "on" state to an "off" state, and vice versa. A relative overall phase shift between the two light beams of an odd/even integer multiple of $\pi$ can, thus, be obtained with arms of shorter length, thereby limiting the attenuation loss of the optical modulator. Moreover, a power consumption reduction is obtained.

Moreover, the Applicant found that the frequency chirp of the output modulated light beam can be controlled by using suitable voltage supplying configurations for each arm.

It is therefore a first aspect of the invention an optical modulator comprising

- an optical splitter for splitting an input light beam into a first and second light beam;
- a first and a second waveguide arm connected to said optical splitter for receiving and transmitting therethrough said first and second light beam, respectively, said waveguide arms each including a core region comprising a group IV semiconductor material or a combination of group IV semiconductor materials;
- an optical combiner connected to said first and second waveguide arm for receiving said first and second light beam and combine them into an output light beam,
- a first and a second electrode structure associated with said first and second waveguide arm, respectively;
- a driving circuit for supplying voltage to said first and second electrode structure, characterized in that said driving circuit is adapted to supply a first modulation voltage superimposed to a first bias voltage to the first electrode structure and a second modulation voltage superimposed to a second bias voltage to the second electrode structure.

Advantageously, the first modulation voltage superimposed to the first bias voltage and the second modulation voltage superimposed to the second bias voltage are adapted to induce through Franz-Keldysh effect a refractive index variation in the material comprised in the respective arm.

Preferably, the material comprised in each core region has, at the working wavelength(s), a negligible absorption coefficient variation induced by Franz-Keldysh effect. Preferably, the absorption coefficient variation $\Delta\alpha$ is, in absolute value, not higher than 0.5 dB in the range of the applied electric field. More preferably, the material comprised in each core region has, at the working wavelength(s), an absorption coefficient substantially constant with the electric field applied to the respective electrode structure.

Preferably, the material comprised in each core region has, at the working wavelength(s), a low absorption coefficient. More preferably, the absorption coefficient is no more than 13 dB/cm (3 cm$^{-1}$). Even more preferably, the absorption coefficient is no more than 8 dB/cm (2 cm$^{-1}$).

Preferably, the material comprised in each core region has, at the working wavelength(s), an appreciable refractive index variation induced by Franz-Keldysh effect.

Preferably, the refractive index variation $\Delta n$ induced by Franz-Keldysh effect is, in absolute value, higher than $2*10^{-5}$ in the range of applied electric field. More preferably, it is, in absolute value, higher than $3*10^{-5}$.

Preferably, the difference in absolute value between the photon energy corresponding to the direct transition absorption edge of the material and the photon energy corresponding to the lowest working wavelength is no more than 0.3 eV (the photon energy being equal to hc/$\lambda$, wherein h is the Planck's constant and $\lambda$ is the wavelength of the radiation associated with the photon). More preferably, it is no more than 0.2 eV. This allows an appreciable refractive index variation induced by Franz-Keldysh effect to be achieved in the material comprised in the core regions of the waveguide arms.

Indeed, the difference in absolute value between the photon energy corresponding to the direct transition absorption edge of the material and the photon energy corresponding to the lowest working wavelength should be small enough so that the material has, at the working wavelength(s), an appreciable refractive index variation induced by Franz-Keldysh effect. At the same time, said difference should be high enough so that the material has at the working wavelength(s) a negligible absorption coefficient and a negligible absorption coefficient variation induced by Franz-Keldysh effect.

Advantageously, the group IV semiconductor material of the core regions is selected from the group comprising Si and Ge and a combination thereof.

In preferred embodiments, the group IV semiconductor material essentially consists of a combination of Ge and Si.

Preferably, the Ge amount is higher than 80%. More preferably, the Ge amount is higher than 85%.

Preferably, the Ge amount is lower than 92%. This allows the attenuation loss in the arms to be limited, at working wavelengths around 1550 nm.

Preferably, the Si amount is lower than 20%. Preferably, the Si amount is lower than 15%. More preferably, the Si amount is higher than 8%.

A material with a Ge amount comprised between 80 and 92% and a Si amount comprised between 8 and 20% allows the above mentioned conditions on the absorption coefficient and the refractive index of the material to be achieved at the working wavelengths comprised in the range of 1530-1560 nm.

Typically, the waveguide arms each includes adjacent regions surrounding the core region. Said adjacent regions may comprise Si, PolySi, (n+, p+) doped Si, (n+, p+) doped PolySi, (n+, p+) doped SiGe, air or SiO$_2$. The refractive index difference between the core region and the adjacent regions is advantageously such as to enable guided propagation in the core region.

Advantageously, the first and second arm are substantially of the same length. This allows a high extinction ratio to be obtained in a simplified way with respect to a Mach-Zehnder structure having arms of different length (the extinction ratio being defined as the ratio between the output optical power when the optical modulator is in a "1" logic state and the output optical power when the optical modulator is in a "0" logic state).

Advantageously, the first and second electrode structure comprise electrodes substantially of the same length. This allows the electronics of the optical modulator to be simplified.

Advantageously, the first and second light beam have substantially the same optical power. That is, the optical splitter is a symmetric splitter adapted to split the input optical beam in two light beams of the same optical power. This allows a high extinction ratio to be obtained in a simplified way with respect to a Mach-Zehnder structure having an asymmetric optical splitter.

Typically, the optical splitter is a Y waveguide junction. According to a variant, it is an optical coupler. Preferably, it is a 3 dB optical coupler.

Advantageously, the optical combiner is a symmetric combiner. Typically, the optical combiner is a Y waveguide junction. According to a variant, it is an optical coupler. Preferably, it is a 3 dB optical coupler.

Typically, the first and second modulation voltage are electric signals carrying binary digital information alternating between a positive peak voltage and a negative peak voltage, wherein the positive peak voltage corresponds to a "1" bit and the negative peak voltage corresponds to a "0" bit (or vice versa).

Typically, the first and second modulation voltage are electric signals having the same waveform (they carry the same binary digital information). Typically, they have inverted sign. Moreover, they can have different or substantially equal peak to peak amplitude.

Typically, the first and second modulation voltage are radio-frequency (RF) electric signals. Typical RF bit rate values are higher than 100 Mbits/s (e.g. 2.5 Gbit/s, 10 Gbit/s).

Advantageously, the driving circuit is adapted to supply to the first and second electrode structure the first and second modulation voltage so that, when the positive peak is supplied to the first electrode structure, the negative peak is supplied to the second electrode structure and vice versa.

The first and second bias voltage and the peak to peak amplitude of the first and second modulation voltage are selected so as to alternate the optical modulator between a "1" logic state and a "0" logic state according to the digital information to be transferred to the optical light beam. At the same time, they are selected depending on the desired chirp value for the output optical modulated light beam.

In particular, the first and second bias voltage and the peak to peak amplitude of the first and second modulation voltage are selected so as to introduce between the optical paths of the two waveguide arms a relative phase shift of $\pi$ (or a odd multiple thereof), in a "0" logic state of the optical modulator, and a relative phase shift of zero (or a even multiple of $\pi$), in a "1" logic state of the optical modulator.

According to an embodiment, the bias and modulation voltages supplied to the first and second electrode structure are such that the overall refractive index variation induced in the arms by Franz-Keldysh effect when the optical modulator passes from a "1" logic state to a "0" logic state, and vice versa, is substantially the same in absolute value but opposite in sign. This allows an output modulated light beam with substantially null chirp to be obtained (for an induced overall refractive index variation confined within a reasonable range of values). Preferably, the first bias voltage supplied to the first electrode structure is substantially the same as the second bias voltage supplied to the second electrode structure. Preferably, the peak to peak amplitude of the first modulation voltage supplied to the first electrode structure is substantially the same as the peak to peak amplitude of the second modulation voltage supplied to the second electrode structure.

According to a variant, the first bias voltage is different from the second bias voltage. Preferably, in this variant, the peak to peak amplitude of the first modulation voltage is different from the peak to peak amplitude of the second modulation voltage and the difference is such that the overall refractive index variation induced by Franz-Keldysh effect in the arms is substantially the same in absolute value but opposite in sign.

According to another embodiment, the bias and modulation voltages supplied to the first and second electrode structure are such that the overall refractive index variation induced in the arms by Franz-Keldysh effect when the optical modulator passes from a "1" logic state to a "0" logic state, and vice versa, is different in absolute value and sign. The Applicant observes that this allows a chirped output modulated light beam to be obtained.

Preferably, the first bias voltage supplied to the first electrode structure is different from the second bias voltage supplied to the second electrode structure. Preferably, the peak to peak amplitude of the first modulation voltage supplied to the first electrode structure is substantially the same as the peak to peak amplitude of the second modulation voltage supplied to the second electrode structure. According to a variant, the peak to peak amplitude of the first modulation voltage is different from the peak to peak amplitude of the second modulation voltage and the difference is such that the overall refractive index variation induced by Franz-Keldysh effect in the arms is different in absolute value and sign.

Advantageously, the optical modulator also comprises a third electrode structure associated with one of the two waveguide arms. Typically, the driving circuit is adapted to supply to the third electrode structure a CW voltage. The CW voltage is typically adapted to introduce a prefixed initial relative phase shift between the optical paths of the two arms. Moreover, it can be adapted to compensate for undesired differences in the waveguide arm lengths due, for example, to inaccuracy of the production process. For example, said predetermined initial relative phase shift is $\pi/2$. According to another example, said predetermined initial relative phase shift is zero.

According to a variant, the optical modulator comprises a third and a fourth electrode structure associated with the first and second waveguide arm, respectively. Typically, the driving circuit is adapted to supply to the third and fourth electrode structure a CW voltage. The supplied CW voltages are typically adapted to introduce a predetermined initial relative phase shift between the optical paths of the two arms. Moreover, it can be adapted to compensate for undesired differences in the waveguide arm lengths due, for example, to inaccuracy of the production process. For example, said predetermined initial relative phase shift is $\pi/2$. According to another example, said predetermined initial relative phase shift is zero.

Advantageously, the optical modulator is integrated on a silicon substrate.

In a second aspect the present invention relates to a unit comprising an optical modulator according to the first aspect of the invention and an electro-optical converter adapted to convert an input optical light beam into a corresponding electrical signal.

As to the structural and functional features of the optical modulator reference is made to what disclosed before with reference to the first aspect of the invention.

The electro-optical converter typically comprises a photodiode.

Advantageously, at least a portion of the electro-optical converter comprises a group IV semiconductor material or a combination of group IV semiconductor materials. Typically, it comprises Si or Ge or a combination thereof.

According to an embodiment, the electro-optical converter is coupled to the optical modulator so as to supply the corresponding electrical signal to the driving circuit of the optical modulator.

Typically, the unit further comprises a filtering element. The filtering element is typically coupled to the electro-optical converter and/or to the optical modulator.

According to an embodiment, the filtering element comprises at least one drop filtering element. The drop filtering element is typically suitable to drop from a wavelength division multiplexed signal a light beam at a predefined wavelength. The drop filtering element is advantageously coupled to the electro-optical converter so as to supply thereto the dropped light beam.

According to an embodiment, the filtering element comprises at least one add filtering element. The add filtering element is typically suitable to add to a wavelength division multiplexed signal a light beam at a predefined wavelength. The optical modulator is advantageously coupled to the add filtering element so as to intensity modulate the light beam to be added to the wavelength division multiplexed signal.

Advantageously, the add and drop filtering elements comprise a material selected from the group comprising a group IV semiconductor material, silicon-compatible materials such as $SiO_2$, doped $SiO_2$, $Si_3N_4$, SiON and a combination thereof.

Advantageously, the electro-optical converter and the optical modulator are integrated on the same silicon substrate. Advantageously, the electro-optical converter, the optical modulator and the filtering element are integrated on the same silicon substrate. This allows these devices to be grown as a single product on the same silicon substrate during their production process, thereby avoiding alignment and gluing steps otherwise required during the assembling process of the unit. Moreover, this reduces the cost and the size of the unit.

In a third aspect the present invention relates to a transmitting station comprising an optical transmitter device, the optical transmitter device comprising an optical source for providing an optical light beam at a predetermined wavelength and an optical modulator according to the first aspect of the invention to modulate the intensity of the optical light beam, associated with the optical source.

As to the structural and functional features of the optical modulator reference is made to what disclosed before with reference to the first aspect of the invention.

Advantageously, the optical source is a semiconductor laser.

According to one embodiment, the optical transmitter device also comprises an electro-optical converter adapted to convert an input modulated light beam at a generic wavelength into a corresponding modulation electric signal, the electro-optical converter being coupled to the optical modulator so as to supply said corresponding modulation electric signal to the driving circuit of the optical modulator. In this way the driving circuit drives the first and second electrode structure of the optical modulator according to the corresponding modulation electric signal received by the electro-optical converter. This embodiment allows an optical modulated light beam having a generic wavelength to be converted into an optical modulated light beam having a predetermined wavelength as disclosed, for example, by the document U.S. Pat. No. 5,267,073.

Advantageously, at least a portion of the electro-optical converter comprises a group IV semiconductor material or a combination of group IV semiconductor materials. Typically, it comprises Si or Ge or a combination thereof.

Advantageously, the electro-optical converter and the optical modulator are integrated on the same silicon substrate. This advantageously allows the two devices to be grown as a single product on the same silicon substrate during their production process, thereby avoiding alignment and gluing steps otherwise required during the assembling process of the transmitting station components. This advantageously reduces the cost and the size of the transmitting station.

The electro-optical converter typically comprises a photodiode.

According to an embodiment, the transmitting station comprises a plurality of optical transmitter devices for providing a corresponding plurality of modulated optical light beams at predetermined wavelengths different from each other.

According to this embodiment, the transmitting station advantageously further comprises a wavelength multiplexing device for wavelength multiplexing the plurality of modulated optical light beams.

In a fourth aspect the present invention relates to an optical communication system comprising a transmitting station according to the third aspect of the invention and an optical communication line having a first end coupled to the transmitting station.

Typically, the optical communication line comprises an optical fiber.

As to the structural and functional features of the optical modulator and of the transmitting station reference is made to what disclosed before with reference to the first and third aspect of the invention.

Typically, the optical communication system further comprises a receiving station coupled to a second end of the optical communication line.

Typically, the optical communication line comprises at least one optical amplifier. Typically, the optical amplifier comprises an optical fiber amplifier, e.g. an erbium doped fiber amplifier.

According to an embodiment, the optical communication system further comprises a unit according to the second aspect of the invention.

As to the structural and functional features of the unit reference is made to what disclosed before with reference to the second aspect of the invention.

In a fifth aspect the present invention relates to a method for modulating the intensity of a light beam comprising the step of a) splitting the light beam into a first and second light beam;
b) propagating said first and second light beam along a first and a second optical path, respectively;
c) combining said first and second light beam into an output light beam after propagation along the first and second optical path;
d) introducing through Franz-Keldysh effect a relative phase shift between the two optical paths so as to obtain an intensity modulation of the output light beam;

characterized in that step d) is carried out by supplying a first modulation voltage superimposed to a first bias voltage to the first optical path and a second modulation voltage superimposed to a second bias voltage to the second optical path.

Advantageously, in step a) the optical beam is split in two light beams of substantially the same optical power.

Typically, the method further comprises a step e) of supplying to one of the two optical paths a CW voltage for introducing a further prefixed relative phase shift between the two optical paths.

Typically, in step d) a relative phase shift of $\pi$ or an integer odd multiple thereof is introduced for obtaining a 0 logic state and a relative phase shift of zero or an integer even multiple of $\pi$ is introduced for obtaining a 1 logic state.

Advantageously, the first and second modulation voltage are electric signals having the same waveform.

Advantageously, the electric signals have inverted sign.

According to an embodiment, the first and second bias voltage and the first and second modulation voltage are such as to induce through Franz-Keldysh effect an overall phase shift in the two optical paths which is substantially the same in absolute value but opposite in sign when passing from the 1 logic state to the 0 logic state, and vice versa. Advantageously, the first bias voltage is substantially the same as the second bias voltage. Preferably, the peak to peak amplitude of the first modulation voltage is substantially the same as the peak to peak amplitude of the second modulation voltage. According to a variant, the first bias voltage is different from the second bias voltage. Preferably, in this variant, the peak to peak amplitude of the first modulation voltage is different from the peak to peak amplitude of the second modulation voltage.

According to another embodiment, the first and second bias voltage and the first and second modulation voltage are such as to induce through Franz-Keldysh effect an overall phase shift in the two optical paths which is different in absolute value and sign, when passing from the 1 logic state to the 0 logic state, and vice versa. Advantageously the first bias voltage is different from the second bias voltage. Preferably, the peak to peak amplitude of the first modulation voltage is substantially the same as the peak to peak amplitude of the second modulation voltage.

BRIEF DESCRIPTION OF THE DRAWINGS

Characteristics and advantages of the invention shall now be illustrated with reference to embodiments represented as a non-limiting example in the attached drawings in which:

FIG. 12 shows the phase shift ($\Delta\phi$, in radians) versus the modulation voltage superimposed to the bias voltage (V, in arbitrary units) supplied to the first electrode structure (dotted line) and to the second electrode structure (continuous line) of the optical modulator of the invention (FIG. 12a) and the pattern of the modulation voltage superimposed to the bias voltage (in arbitrary units) versus time (in ps) supplied to the first electrode structure ($V_{RF1}$, dotted line) and to the second electrode structure ($V_{RF2}$, continuous line; FIG. 12b) according to a third voltage configuration;

DETAILED DESCRIPTION OF THE INVENTION

Figure 7:
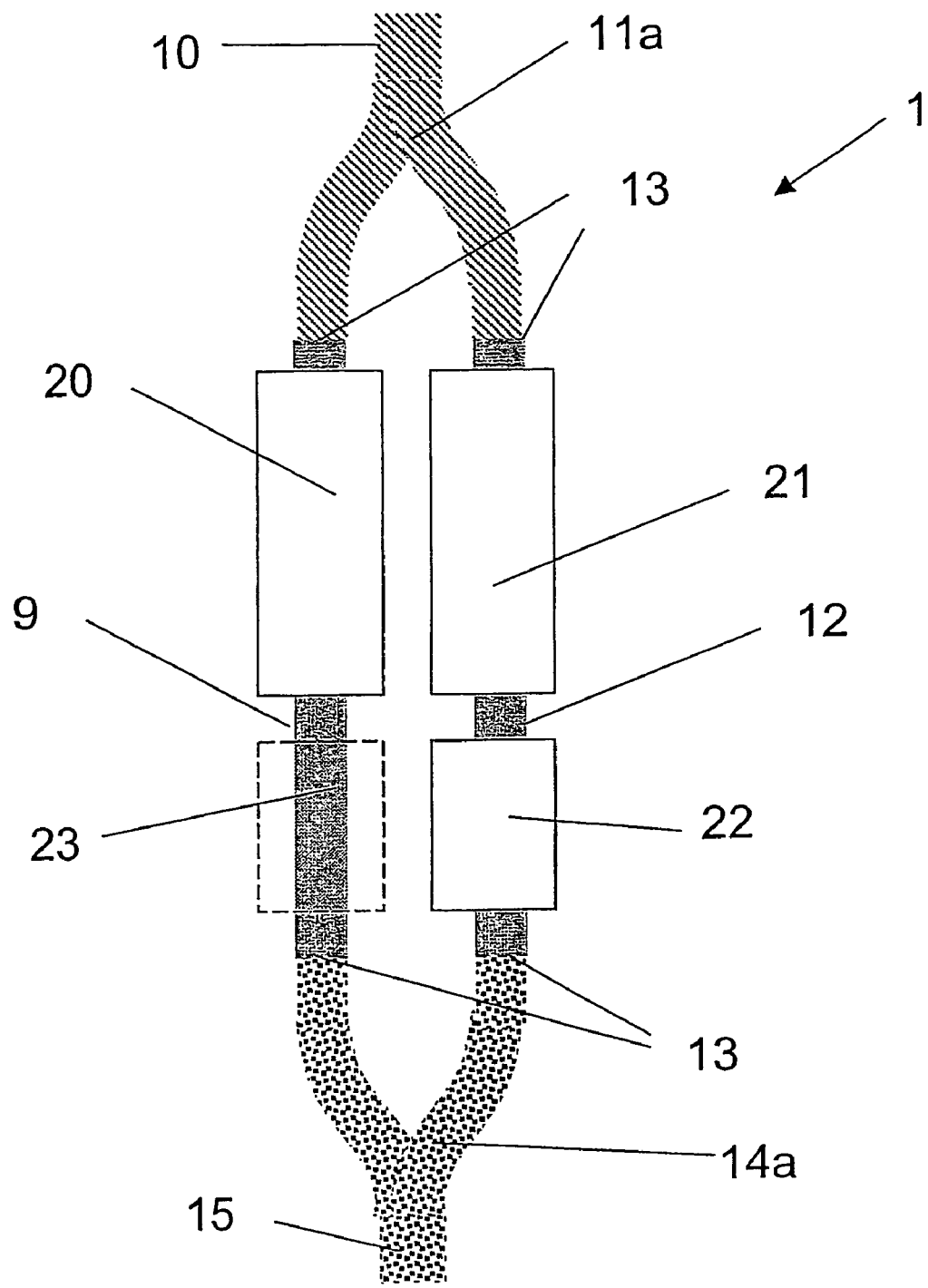
FIG. 7 schematically shows an embodiment of an optical modulator of the present invention.

FIG. 7 shows an embodiment of an optical modulator 1 according to the invention comprising a Mach-Zehnder structure, a first electrode structure 20, a second electrode structure 21, a third electrode structure 22, optionally, a fourth electrode structure 23 and a driving circuit (not shown in FIG. 7) for driving the first, second, third and the fourth electrode structure (if present) 20, 21, 22, 23.

In the embodiment of FIG. 7 (see also FIG. 1a), the Mach-Zehnder structure comprises an input waveguide 10; an optical splitter 11a for splitting an input light beam in two light beams; a first 9 and a second 12 waveguide arm for receiving and transmitting therethrough the two light beams; an optical combiner 14a for combining the two light beams into an output light beam; an output waveguide 15; junction regions 13 between the waveguide arms 9, 12 and the optical splitter 11a and optical combiner 14a.

In the optical modulator 1 the first electrode structure 20 is associated with the first waveguide arm 9, the second electrode structure 21 is associated with the second waveguide arm 12, the third electrode structure 22 is associated with the second waveguide arm 12 and the fourth electrode structure 23 (if present) is associated with the first waveguide arm 9.

The input waveguide 10 comprises a material having a low absorption coefficient at the working wavelength(s). For example, the absorption coefficient is lower than 2 dB/cm. For example, the material is selected from the group comprising Si, $Si_3N_4$, SiON, $SiO_2$ and suitably doped $SiO_2$. Moreover, the input waveguide 10 is suitable to be coupled to an optical fiber supplying the input light beam.

The optical splitter 11a is advantageously a symmetric (i.e. 50/50) splitter adapted to split the input light beam in two light beams having substantially the same optical power. Splitting ratios of 45/55, preferably of 47/53, may be however tolerated. In the embodiment shown in the FIGS. 1a and 7, the optical splitter 11a is a conventional y waveguide junction. Advantageously, the optical splitter 11a comprises a material having a low absorption coefficient at the working wavelength(s). For example, the absorption coefficient is lower than 2 dB/cm. For example, the material is selected from the group comprising Si, $Si_3N_4$, SiON, $SiO_2$ and suitably doped $SiO_2$. Preferably, it comprises the same material as the input waveguide 10.

The optical combiner 14a is advantageously a symmetric combiner adapted to recombine the two light beams into an output optical light beam. In the embodiment shown in the FIGS. 1a and 7 the optical combiner 14a is a conventional y waveguide junction. The optical combiner 14a advantageously comprises a material having low absorption coefficient at the working wavelength(s). For example, the absorption coefficient is lower than 2 dB/cm. For example, the material is selected from the group comprising Si, $Si_3N_4$, SiON, $SiO_2$ and suitably doped $SiO_2$.

Figures 1A, 1B:
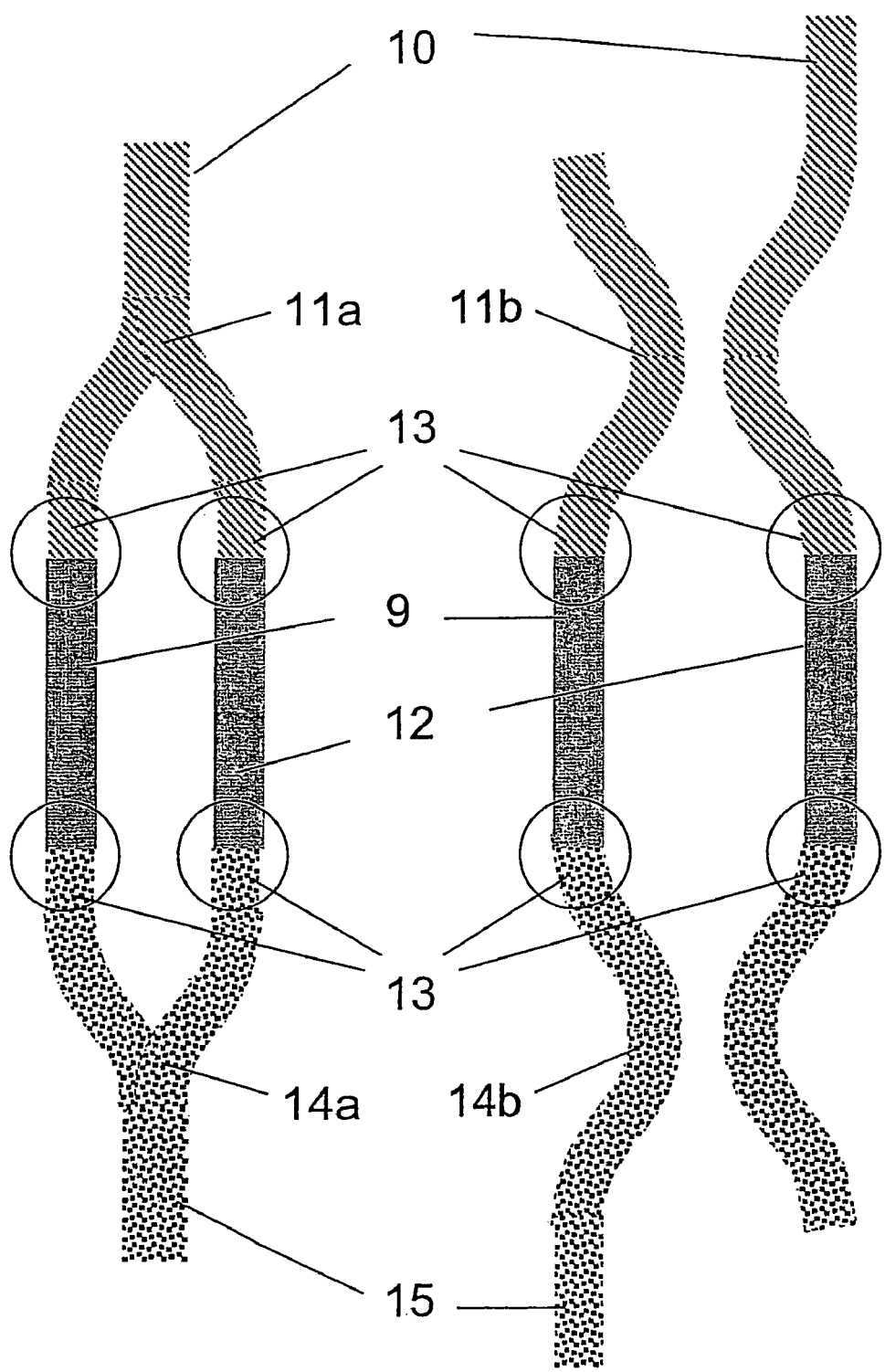
FIG. 1 schematically shows a first (FIG. 1a) and a second (FIG. 1b) embodiment of a Mach-Zehnder structure of the waveguides of an optical modulator according to the invention.

FIG. 1b shows another embodiment of the Mach-Zehnder structure which differs from the embodiment of FIG. 1a in that the optical splitter 11b and the optical combiner 14b are conventional directional couplers, e.g. 3 dB couplers.

The output waveguide 15 advantageously comprises a material having low absorption coefficient at the working wavelength(s). For example, the absorption coefficient is lower than 2 dB/cm. For example, the material is selected from the group comprising Si, $Si_3N_4$, SiON, $SiO_2$ and suitably doped $SiO_2$. Preferably, it comprises the same material as the optical combiner 14a or 14b. Moreover, the output waveguide 15 is preferably suitable to be coupled to an optical fiber for receiving and transmitting therethrough the output light beam.

The junction regions 13 may be butt couplings (when the optical splitter 11a, 11b and optical combiner 14a, 14b are made of Si) or comprise grating assisted couplers o tapered assisted couplers.

The waveguide arms 9, 12 are advantageously of substantially the same length. Moreover, according to the invention, they each includes a core region comprising a group IV semiconductor material and adjacent regions surrounding the core region. Said adjacent regions may comprise Si, (n+, p+) doped Si, (n+, p+) doped PolySi, (n+, p+) doped SiGe, air or $SiO_2$. The refractive index difference between the core region and the adjacent regions is such as to enable guided propagation in the core region.

For use at working wavelengths comprised in a 1530-1610 nm range (that is, in the typical wavelength band for telecommunications), the two core regions advantageously comprise a Ge based material (i.e., having a major percentage of Ge) comprising a certain amount of Si (hereinafter referred to as SiGe material).

It is noted that Ge has a direct transition at 0.8 eV which corresponds to a wavelength of about 1550 nm. Therefore, it is highly absorptive at 1550 nm. However, as the addition of Si raises the direct transition energy of the Ge based material, a SiGe material can be obtained which is low absorptive at 1550 nm.

In particular, according to the invention, the Si and Ge amounts are preferably such that the difference, in absolute value, between the photon energy corresponding to the direct transition absorption edge of the SiGe material and the photon energy corresponding to the lowest working wavelength (e.g. 1530 nm) is small enough so that the material has, in the 1530-1560 nm range, an appreciable refractive index variation induced by Franz-Keldysh effect. At the same time, the Si and Ge amounts are preferably such that said difference is high enough so that the SiGe material has in the 1530-1560 nm range a low absorption coefficient and a negligible absorption coefficient variation induced by Franz-Keldysh effect.

For example, a SiGe material comprising a Si amount of 10% and a Ge amount of 90% meets such requirements.

Figure 2:
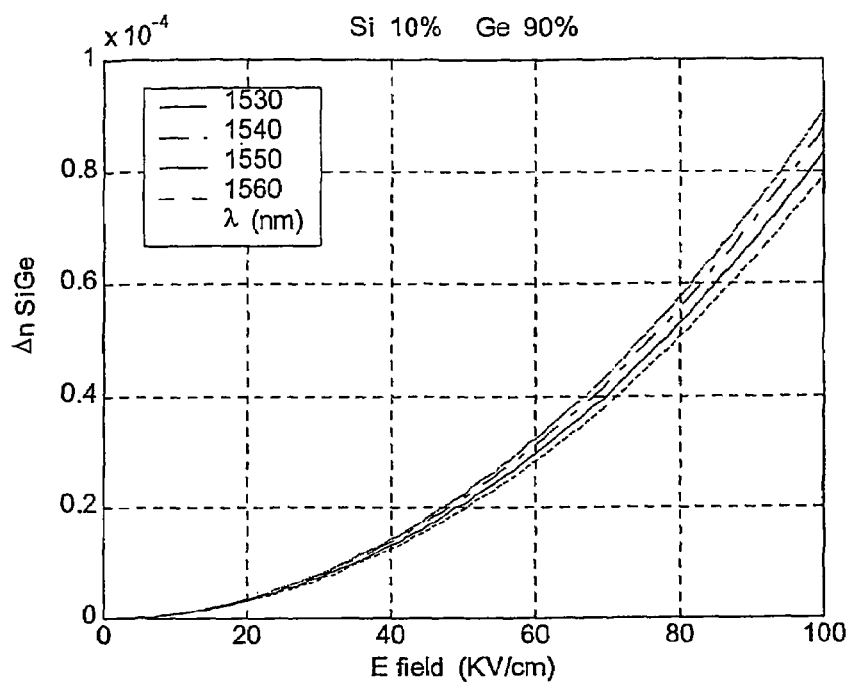
FIG. 2 shows the refractive index variation versus an applied electric field for a SiGe material comprising a Si amount of 10% and a Ge amount of 90% in the wavelength range of 1530-1560 nm.

FIG. 2 shows the refractive index variation versus an applied electric field for such SiGe material in the wavelength range of 1530-1560 nm. It is noted that the refractive index varies quadratically with the applied electric field. Moreover, it is observed that a refractive index variation $\Delta n$ of about $0.5*10^{-4}$ is obtained for an applied electric field of about 80 KV/cm. For example, this $\Delta n$ value allows a $\pi/2$ phase shift to be obtained in a waveguide arm length of about 7 mm.

Figure 3:
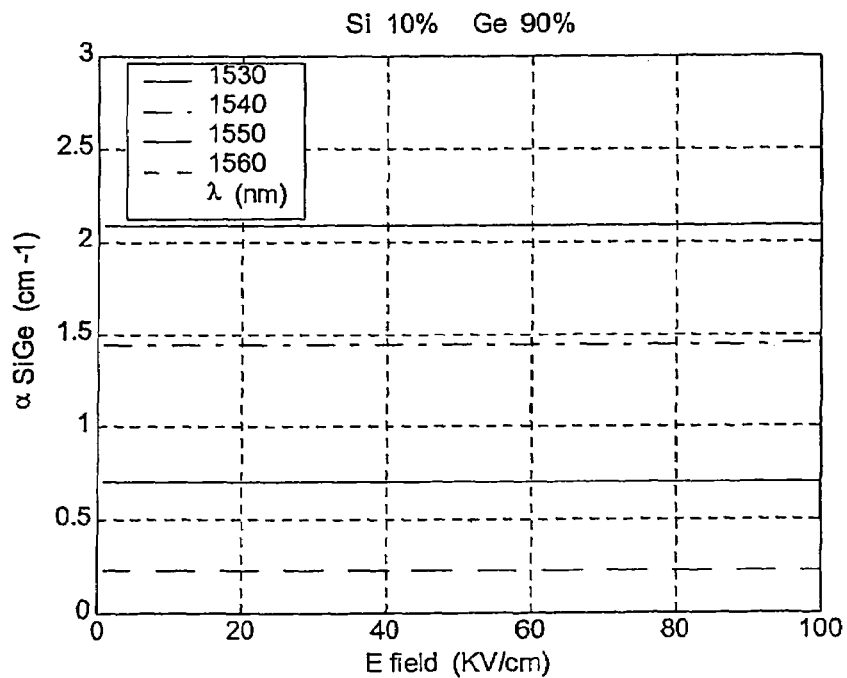
FIG. 3 shows the absorption coefficient versus an applied electric field for a SiGe material comprising a Si amount of 10% and a Ge amount of 90% in the wavelength range of 1530-1560 nm.

FIG. 3 shows the absorption coefficient versus an applied electric field for said SiGe material comprising a Si amount of 10% and a Ge amount of 90% in the wavelength range of 1530-1560 nm. It is noted that in such wavelength range the absorption coefficient is lower than 2 $cm^{-1}$ and substantially constant with the applied electric field.

In this way the two optical light beams passing through the two arms 9 and 12 undergo a low attenuation (lower than 2 $cm^{-1}$) and substantially constant with the applied electric field.

Therefore, when a voltage is applied to the first arm 9 which is higher than the voltage applied to the second arm 12 (or vice versa) the two optical light beams passing through the arms 9, 12 advantageously undergo substantially the same attenuation.

Figure 4A:
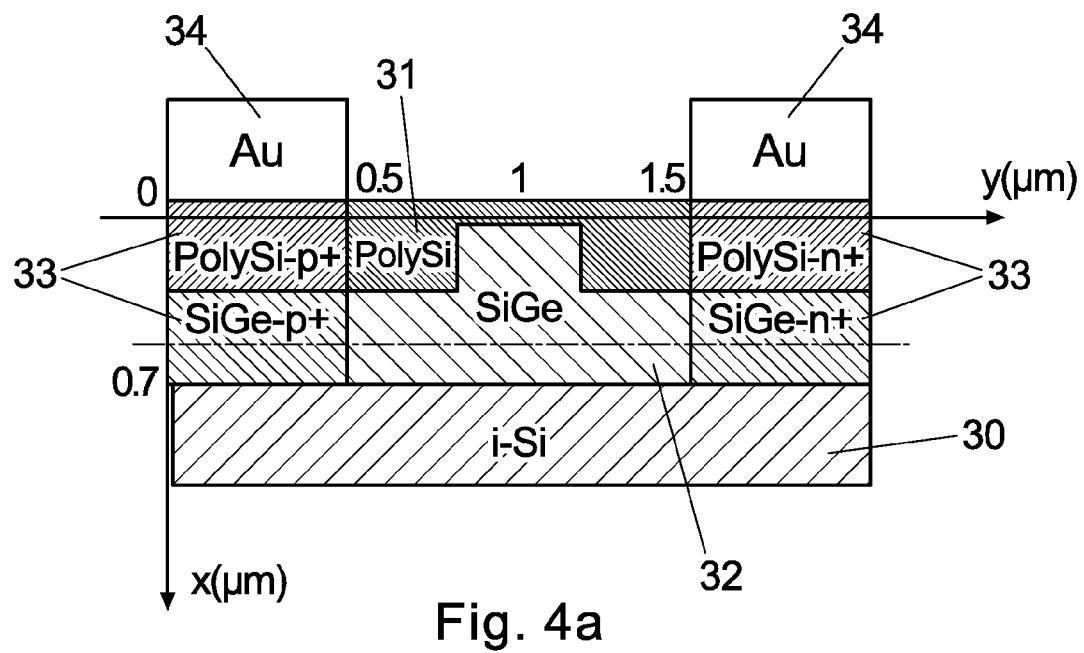
FIG. 4 shows the structure of a waveguide arm of the optical modulator of the invention according to a first (FIG. 4a) and a second (FIG. 4b) embodiment.

FIG. 4a shows one of the waveguide arms 9, 12 associated with the respective electrode structure, according to a first embodiment of the invention. According to this embodiment, each waveguide arm comprises a SiGe ridged region 32 (core region) grown on a intrinsic silicon (i-Si) substrate 30 and covered by a PolySi upper cladding 31. On the sides of the SiGe ridged region 32, doped (n+ or p+) PolySi and SiGe regions 33 form N+ and P+ ohmic contacts of a PIN structure, as shown in FIG. 4a. Metallic contacts 34 (for example Au metallic contacts) are further disposed, directly contacting the N+ and P+ ohmic contacts. The metallic contacts 34 (and the doped regions 33) form the first electrode structure 20 and the fourth electrode structure 23 (if present), or the second electrode structure 21 and the third electrode structure 22, of the optical modulator 1.

Figure 4B:
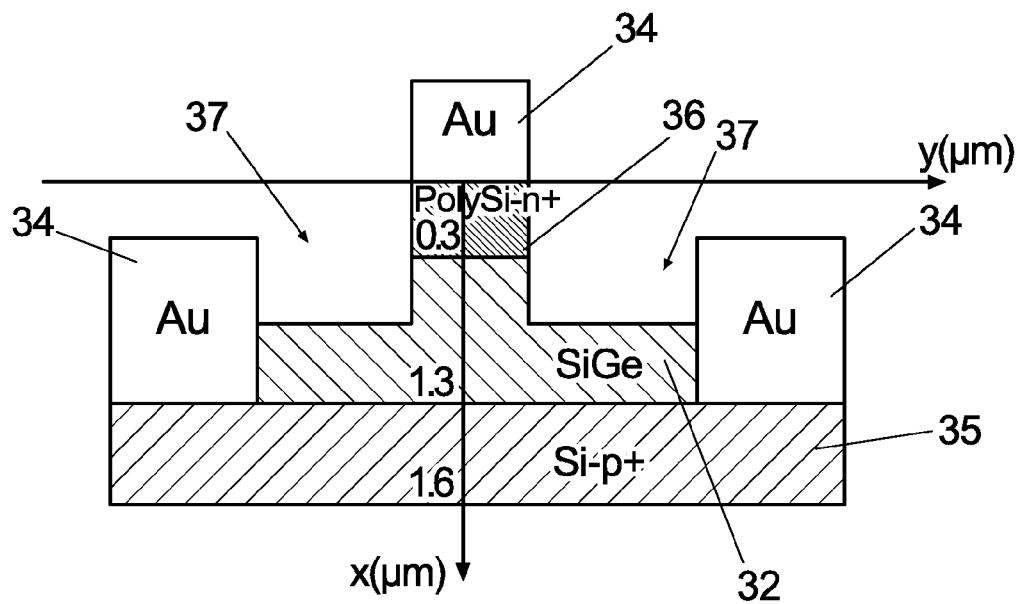

FIG. 4b shows one of the waveguide arms 9, 12 associated with the respective electrode structure, according to a second embodiment of the invention. According to this embodiment, each waveguide arm comprises a SiGe ridged region 32 (core region) grown on a Si substrate 35, which is doped (p+ or n+) in order to form a P+ or N+ ohmic contact. The SiGe ridged region 32 is further covered by a PolySi region 36, which is doped (n+ or p+) in order to form a further N+ or P+ ohmic contact. Each waveguide arm further comprises upper cladding regions 37 (that may comprise air, $SiO_2$ or PolySi), side metallic contacts 34 and central metallic contact 34 (for example Au metallic contacts) directly contacting the N+ or P+ ohmic contact 35 and 36. The metallic contacts 34 (and the doped regions 35, 36) form the first electrode structure 20 and the fourth electrode structure 23 (if present), or the second electrode structure 21 and the third electrode structure 22, of the optical modulator 1.

In FIG. 4b, the distance between the side metallic contacts 34 and the centre of the SiGe ridged region 32 is preferably higher than 5 μm for avoiding optical power losses due to the presence of metallic contacts 34.

In both embodiments of FIGS. 4a and 4b, the sizes of the SiGe ridged region 32 are preferably such as to enable single mode propagation at the working wavelength(s). As stated by Soref et al. (Journal of Quantum Electronics, vol. 27, no. 8, 1991, page 1971), single mode propagation is obtained when the following relation is met:

$$\frac{a}{b} \le 0.3 + \frac{r}{\sqrt{1-r^2}}$$

wherein the width of the central part of the ridged region 32 is designated as 2aλ, the height of the central part of the ridged region 32 is designated as 2bλ, the height of the side parts of the ridged region 32 is designated as 2brλ, λ is the free-space optical wavelength and r is the fractional height of the side parts compared to the central part.

Moreover, the a and b values and the position of metallic contacts 34 are preferably such that the electric field applied to the SiGe ridged region 32 is higher than 5 KV/cm for each Volt applied between the metallic contacts 34 (so as to limit the power consumption) and, at the same time, such that the optical attenuation loss is limited.

Indeed, applied voltage being equal, the effective electric field (and thus, the Franz-Keldysh effect) increases when the distance between the p+ doped region and n+ doped region decreases. However, when such distance is too low there is a significant penetration of the optical field into the p+ and n+ highly doped regions, thereby increasing the optical attenuation loss.

A good compromise between the two conflicting requirements is a distance between the p+ doped region and n+ doped region lower than 2 μm and a dopant concentration of $10^{17}$-$10^{19}$ $cm^{-3}$.

Figure 5:
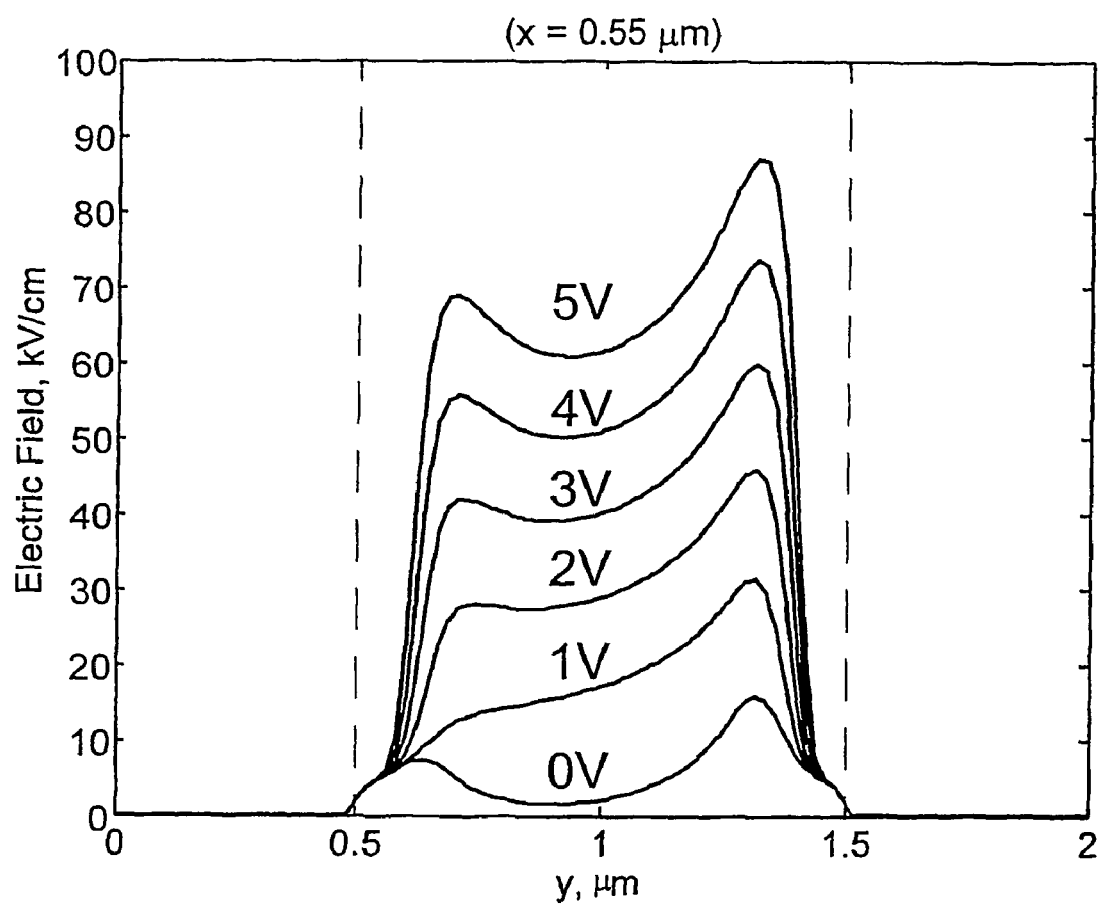
FIG. 5 shows the electric field versus the y direction on a horizontal section of the waveguide arm of FIG. 4a, taken at x=0.55 μm.
Figure 6:
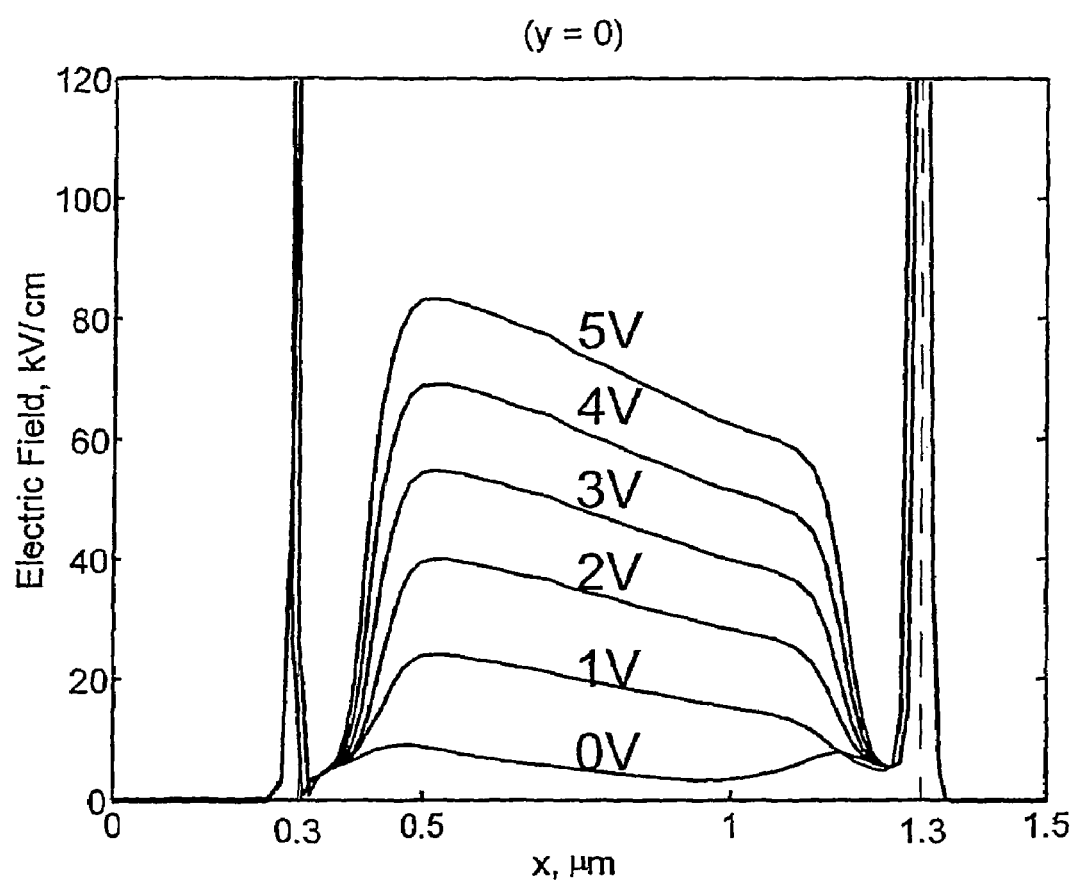
FIG. 6 shows the electric field on a vertical section of the structure of FIG. 4b, taken at y=0.

FIG. 5 shows the electric field versus the y direction for a horizontal section of the arm of FIG. 4a, taken at x=0.55 μm, as shown in FIG. 4a. FIG. 6 shows the electric field for a vertical section of the structure of FIG. 4b, taken at y=0, as shown in FIG. 4b.

The driving circuit of the optical modulator 1 supplies voltage to the metallic contacts 34. In particular, in the embodiment of FIG. 4a the voltage may be supplied to one of the contacts while the other may be grounded. In the embodiment of FIG. 4b the voltage may be supplied to the central contact while the side contacts may be grounded.

According to the invention, the driving circuit is adapted to supply a first modulation voltage superimposed to a first bias voltage to the first electrode structure 20 and a second modulation voltage superimposed to a second bias voltage to the second electrode structure 21 so as to induce a refractive index variation in the material of the core regions 32 of the waveguide arms 9, 12 through Franz-Keldysh effect.

Typically, the first modulation voltage and the second modulation voltage are RF electric signals carrying the same binary information to be transferred to the input optical light beam and alternate between a positive peak voltage (corresponding to a "1" bit) and a negative peak voltage (corresponding to a "0" bit).

In order to avoid retro-reflection of the RF electric signal from metallic contacts 34, a suitable impedance (e.g. a suitable resistor) is applied between the metallic contact to which the RF electric signal is supplied and the grounded metallic contact.

Moreover, the driving circuit is adapted to supply a CW voltage to the third electrode structure 22 (and, optionally, to the fourth electrode structure 23).

The CW voltage supplied to the third electrode structure 22 (and, optionally, to the fourth electrode structure, 23) is selected so as to obtain a predetermined initial phase shift between the optical path of the two waveguide arms 9, 12.

Typically, the first and second modulation voltage are electric signals having the same waveform (in that they carry the same binary digital information). However, they can have different peak, to peak amplitude.

Moreover, the first modulation voltage and the second modulation voltage are advantageously supplied to the first and second electrode structures 20, 21 with inverted sign. That is, they are supplied so that the positive peak voltage is supplied to an electrode structure when the negative peak voltage is supplied to the other electrode structure, and vice versa.

As shown in FIG. 2, it is noted that the refractive index of the SiGe material varies quadratically with respect to the applied electric field.

Therefore, a configuration with modulation voltages oscillating with inverted sign about zero between a positive peak voltage and a negative peak voltage (with no bias voltage supplied to the electrode structures) would give in the optical modulator of the invention the same overall refractive index variation +Δn in the two waveguide arms and, thus, no relative phase shift between the two waveguide arms.

Accordingly, in order to reach a push-pull condition, in the device of the invention each modulation voltage is superimposed to a respective bias voltage and supplied with inverted sign to the respective electrode structure, so that an overall refractive index variation of different sign can be induced through Franz-Keldysh effect in the two arms and a relative phase shift between them can be obtained.

Figure 19:
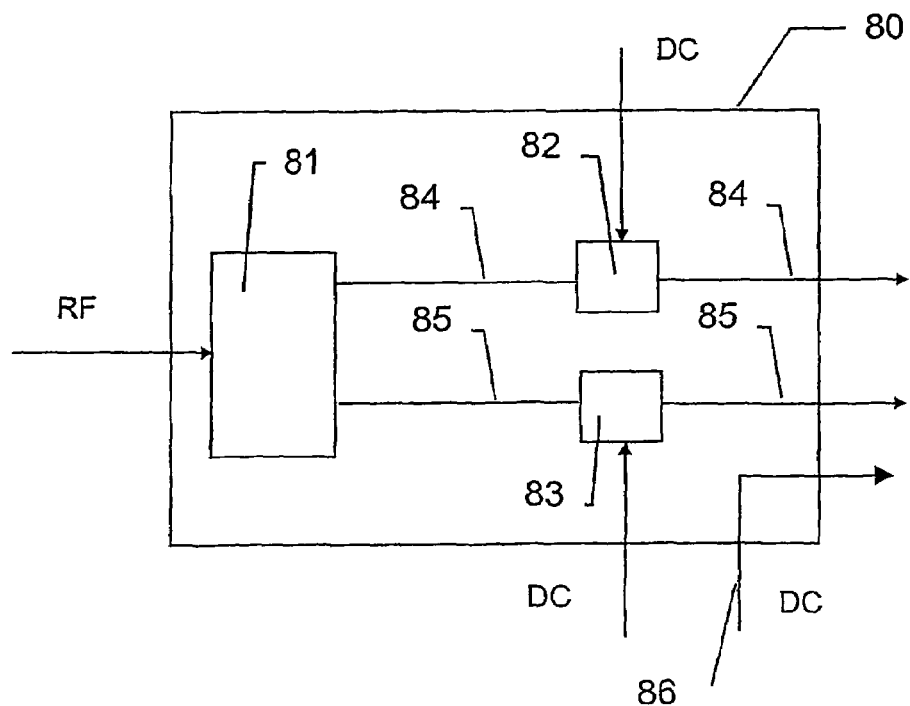
FIG. 19 shows an embodiment of a driving circuit for the optical modulator of the invention.

FIG. 19 shows an embodiment of a driving circuit 80 comprising an electrical driver 81, a first and a second Bias-Tee device 82, 83 and a first, a second and a third electrical path 84, 85, 86.

Typically, the driver 81 is of the conventional type, known as differential driver, dual balanced driver or dual output driver. The driver 81 is adapted to receive a RF electric signal carrying the digital information to be transferred to the optical light beam through the optical modulator, to amplify it and to output the first and second modulation voltage having the same waveform, inverted sign and different or equal peak to peak amplitude (depending, as disclosed in detail below, on the required voltage configuration).

The first and second Bias-Tee device 82, 83 are conventional devices adapted to respectively receive the first and second modulation voltage from the driver 81 and the first and second bias voltage and to combine them in output. The first and second Bias-Tee device 82, 83 are respectively coupled to the first and second electrode structure (not shown in FIG. 19) to supply thereto the respective modulation voltage superimposed to the respective bias voltage.

The electrical paths 84, 85 connect the driver outputs to the respective Bias-Tee device 82, 83 and the Bias-Tee device outputs to the first and second electrode structure. Advantageously, the electrical paths 84, 85 are such that the first and second modulation voltage at the first and second electrode structure are in phase.

The third electrical path 86 supplies the CW voltage to the third electrode structure 22. When necessary, a fourth optical path (not shown) supplies a CW voltage to the fourth electrode structure 23.

According to a variant, instead of a single driver the driving circuit may comprise two drivers (not shown). In this case, the two drivers are adapted to receive a respective input electric signal carrying the digital information to be transferred to the optical light beam through the optical modulator and to amplify it. The electric signals in input to the drivers should already have the same waveform, inverted sign and different or equal peak to peak amplitude (depending, as disclosed in detail below, on the required voltage configuration).

Depending on the binary information to be transferred to the optical light beam, the optical modulator 1 alternates between a "1" logic state and a "0" logic state.

The CW voltage supplied to the third electrode structure 22 (and, optionally, to the fourth electrode structure 23), the first and second bias voltage and the peak to peak amplitude of the first and second modulation voltage are selected so as to introduce between the optical path of the two waveguide arms 9, 12 a relative phase shift of $\pi$ (or a odd multiple thereof), in a "0" logic state of the optical modulator 1, and a relative phase shift of zero (or a even multiple of $\pi$), in a "1" logic state of the optical modulator. At the same time, they are selected depending on the desired chirp value for the output optical modulated light beam.

Figure 8A:
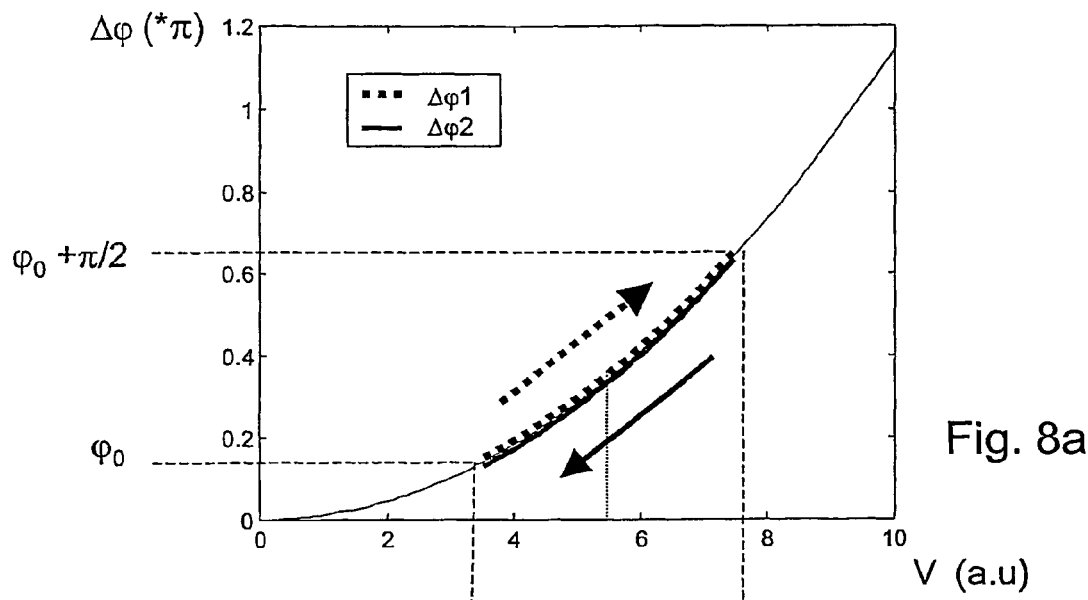
FIG. 8 shows the phase shift ($\Delta\phi$, in radians) versus the modulation voltage superimposed to the bias voltage (V, in arbitrary units) supplied to the first electrode structure (dotted line) and to the second electrode structure (continuous line) of the optical modulator of the invention (FIG. 8a) and the pattern of the modulation voltage superimposed to the bias voltage (in arbitrary units) versus time (in ps) supplied to the first electrode structure ($V_{RF1}$, dotted line) and to the second electrode structure ($V_{RF2}$, continuous line.
FIG. 8b), according to a first voltage configuration.
Figure 8B:
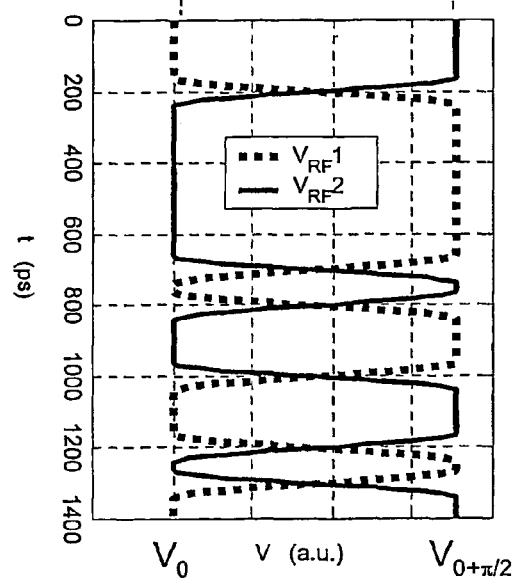
Figure 10A:
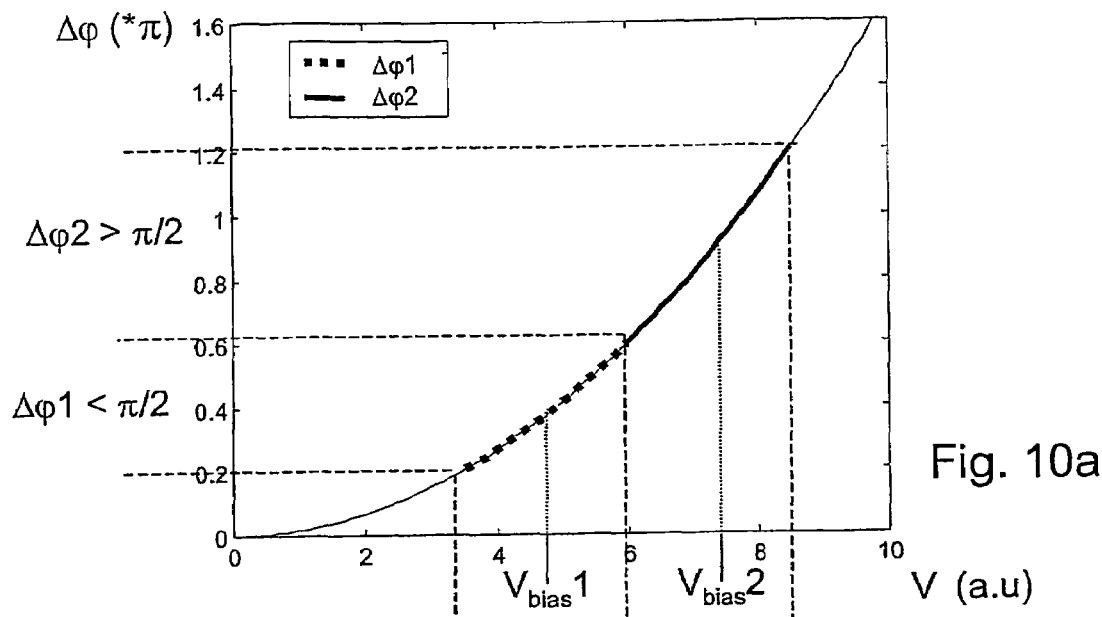
FIG. 10 shows the phase shift ($\Delta\phi$, in radians) versus the modulation voltage superimposed to the bias voltage (V, in arbitrary units) supplied to the first electrode structure (dotted line) and to the second electrode structure (continuous line) of the optical modulator of the invention (FIG. 10a) and the pattern of the modulation voltage superimposed to the bias voltage (in arbitrary units) versus time (in ps) supplied to the first electrode structure ($V_{RF1}$, dotted line) and to the second electrode structure ($V_{RF2}$, continuous line.
FIG. 10b), according to a second voltage configuration.
Figure 10B:
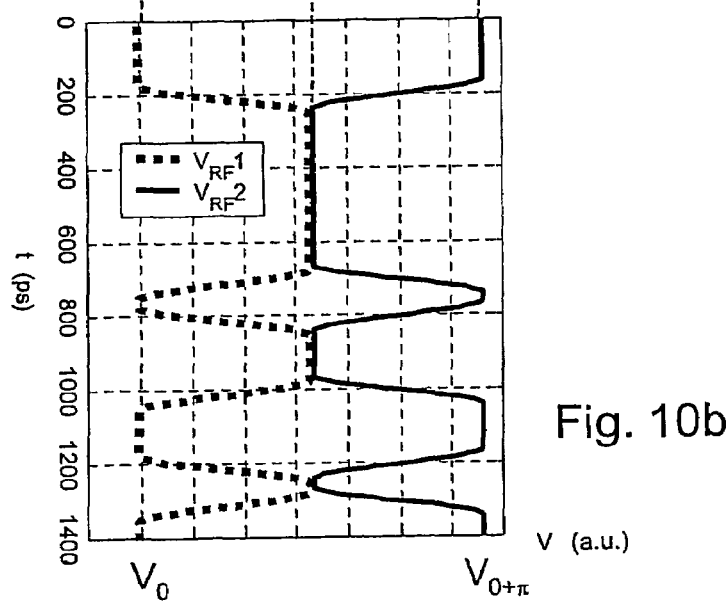

FIGS. 8, 10 and 12 show three possible voltage configurations for the optical modulator 1 of the invention. In particular, FIGS. 8a, 10a and 12a show the phase shift ($\Delta\phi$, in radians) versus the modulation voltage superimposed to the bias voltage (V, in arbitrary units) supplied to the first electrode structure 20 (dotted line) and to the second electrode structure 21 (continuous line). Moreover, FIGS. 8b, 10b and 12b show the pattern of the modulation voltage superimposed to the bias voltage (in arbitrary units) versus time (in ps) supplied to the first electrode structure ($V_{RF1}$, dotted line) and to the second electrode structure 21 ($V_{RF2}$, continuous line).

As shown in FIGS. 8, 10, 12, the first and second modulation voltage have the same waveform but inverted sign.

FIGS. 8 and 12 show two different configurations adapted to obtain an output modulated light beam with substantially null chirp while FIG. 10 shows a configuration adapted to obtain an output modulated light beam with a negative chirp.

In the first configuration of FIG. 8 the driving circuit 80 of the optical modulator 1 supplies a CW voltage to the third electrode structure 22 such as to introduce an initial phase shift $\Delta\phi_{in}=\phi 2_{in}-\phi 1_{in}$ of $\pi/2$ between the optical path of the second arm 12 and the first arm 9. Moreover, the driving circuit 80 supplies to the first and second electrode structure 20, 21 modulation voltages having the same peak to peak amplitude, superimposed to the same bias voltage. More in particular, the modulation voltage superimposed to the bias voltage varies between a minimum value of $V_0$ to which corresponds a phase $\phi_{RF}$ of $\phi_0$ and a maximum value of $V_{0+\pi/2}$ to which corresponds a phase $\phi_{RF}$ of $\phi_0+\pi/2$. Moreover, it is supplied so that the minimum voltage $V_0$ is supplied to the first electrode structure 20 while the maximum voltage $V_{0+\pi/2}$ is supplied to the second electrode structure 21, and vice versa.

Therefore, the off state or "0" logic state of the optical modulator 1 is obtained when the minimum voltage $V_0$ is supplied to the first electrode structure 20 while the maximum voltage $V_{0+\pi/2}$ is supplied to the second electrode structure 21. That is, when the phase shift between the two optical paths is $\Delta\phi=\phi 2-\phi 1=(\phi 2_{in}+\phi_{RF2})-(\phi_{RF1})=(\pi/2+\phi_0+\pi/2)-(\phi_0)=\pi$.

By contrast, the on state or "1" logic state is obtained when the minimum voltage $V_0$ is supplied to the second electrode structure 21 while the maximum voltage $V_{0+/2}$ is supplied to the first electrode structure 20. That is, when the phase shift between the two optical paths is $\Delta\phi=\phi 2-\phi 1=(\phi 2_{in}+\phi_{RF2})-(\phi_{RF1})=(\pi/2+\phi_0)-(\phi_0+\pi/2)=0$.

Figure 9A:
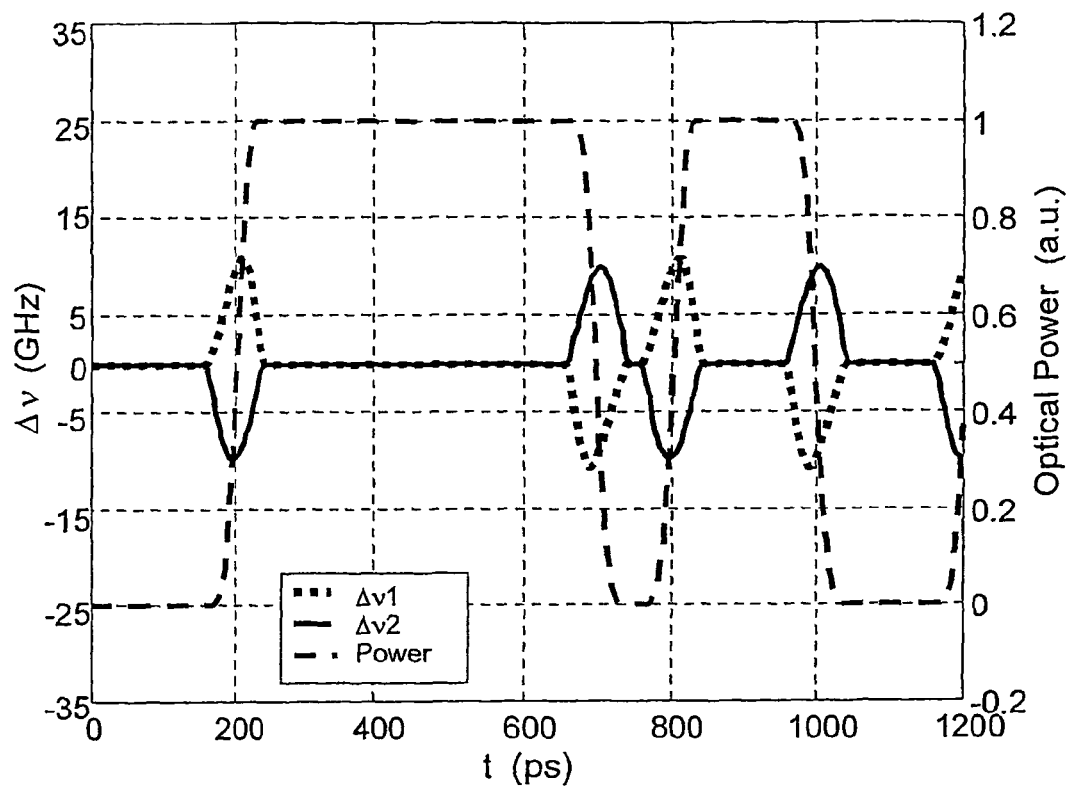
FIG. 9a shows the frequency variation $\Delta\nu$ (GHz) versus time (ps) undergone, in the optical modulator of the invention with the voltage configuration of FIG. 8, by the first optical light beam traveling through the first arm (dotted line) and by the second optical light beam traveling through the second arm (continuous line) and the optical power (in arbitrary units) of the output modulated optical light beam versus time (ps; dashed line)

FIG. 9a shows the frequency variation $\Delta\nu$ undergone by the first optical light beam traveling through the first arm 9 (dotted line) and by the second optical light beam traveling through the second arm 12 (continuous line) versus time. Moreover, it shows the optical power variation of the output modulated optical light beam (in arbitrary units) versus time (dashed line).

It is noted that the overall phase shift $\Delta\phi$ undergone by the first optical light beam traveling through the first arm and by the second optical light beam traveling through the second arm when the optical modulator passes from a "on" state to an "off" state, and vice versa, is the same in absolute value but opposite in sign. In case of a linear variation of the refractive index with the applied electric field this would give (in an ideal case) an output modulated light beam with null chirp. However, in the optical modulator of the invention, due to the non-linear variation of the refractive index, the instantaneous phase variation $\Delta\phi$ (and the instantaneous frequency variation $\Delta\nu$), undergone by the light beams at each instant, is different. However, as it can be seen from FIG. 9a, the instantaneous frequency variations undergone by the first and second optical beams in this configuration are very similar.

Indeed, a small-signal analysis performed by the Applicant on the modulator of the invention with the voltage configuration of FIG. 8 gave a 0.02 chirp (i.e., a substantially null chirp).

Figure 9B:
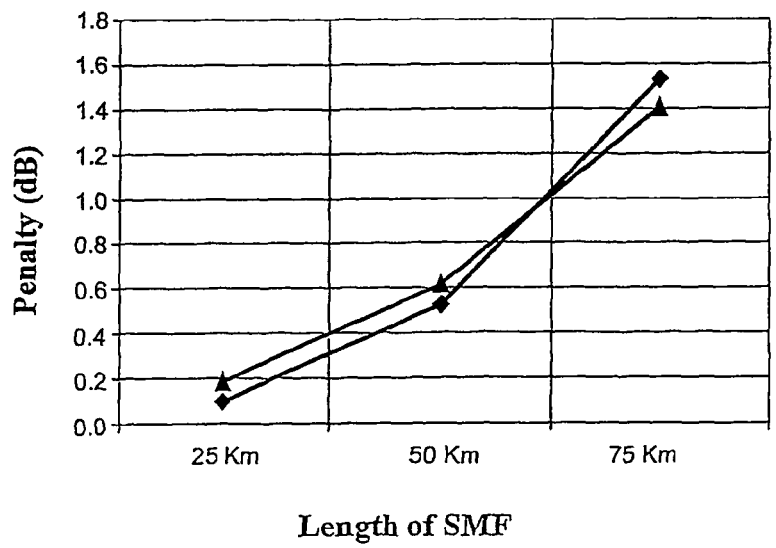
FIG. 9b shows the penalty versus fiber length computed in case of propagation in a standard single mode fiber (SMF) for an optical light beam modulated by the modulator of the invention having the voltage configuration of FIG. 8 (continuous line with rhombus) or by a conventional push-pull LiNbO$_3$ modulator having a chirp parameter equal to +0.1 ((continuous line with triangles)

Moreover, as shown in FIG. 9b, the Applicant compared through a system simulation the performance of this optical modulator of the invention with that of a conventional push-pull $LiNbO_3$ optical modulator, wherein the refractive index variation induced by Pockels effect is linear.

In particular, FIG. 9b shows the penalty versus fiber length computed in case of propagation in a standard single mode fiber (SMF) of an optical light beam modulated by the modulator of the invention according to the configuration of FIG. 8 (continuous line with rhombus) or by a conventional push-pull $LiNbO_3$ modulator having a chirp parameter equal to +0.1 (continuous line with triangles). The performances of the two modulators are comparable.

As stated above, FIG. 12 shows another possible configuration adapted to obtain an output modulated light beam with a substantially null chirp.

According to this configuration, the driving circuit 80 of the optical modulator 1 supplies a CW voltage to the third electrode structure 22 such as to introduce an initial zero phase shift ($\Delta\phi_{in}=\phi 2_{in}-\phi 1_{in}=0$) between the optical path of the second arm 12 and the first arm 9. In practice, this may correspond to a null CW voltage supplied to the third electrode structure 22, if the lengths of the waveguide arms 9, 12 of the modulator are equal. Moreover, the driving circuit 80 supplies to the first and second electrode structure 20, 21 modulation voltages having different peak to peak amplitude and being superimposed to different bias voltages ($V_{bias1}$ and $V_{bias2}$), respectively. More in particular, the first modulation voltage superimposed to the first bias voltage varies between a minimum value of $V_0$ to which corresponds a phase $\phi_{RF1}$ of $\phi_0$ and a maximum value of $V_{0+\pi/2}$ to which corresponds a phase $\phi_{RF1}$ of $\phi_0+\pi/2$. At the same time, the second modulation voltage superimposed to the second bias voltage varies between a maximum value of $V_{(0+\pi)}$ to which corresponds a phase $\phi_{RF2}$ of $\phi_0+\pi$ and a minimum value of $V_{0+\pi/2}$ to which corresponds a phase $\phi_{RF2}$ of $\phi_0+\pi/2$. The modulation voltages are supplied so that the minimum voltage is supplied to the first electrode structure 20 while the maximum voltage is supplied to the second electrode structure 21, and vice versa.

Therefore, the off state or "0" logic state is obtained when the minimum voltage $V_0$ is supplied to the first electrode structure 20 while the maximum voltage $V_{0+\pi}$ is supplied to the second electrode structure 21. That is, when the phase shift between the two optical paths is $\Delta\phi=\phi2-\phi2=(\phi_{RF2})-(\phi_{RF1})=(\phi_0+\pi)-(\phi_0)=\pi$.

By contrast, the on state or "1" logic state is obtained when the minimum voltage $V_{0+\pi/2}$ is supplied to the second electrode structure 21 while the maximum voltage $V_{0+\pi/2}$ is supplied to the first electrode structure 20. That is, when the phase shift between the two optical paths is $\Delta\phi=\phi2-1=(\phi 2_{RF})-(\phi 1_{RF})=(\phi_0+\pi/2)-(\phi_0+\pi/2)=0$.

Figure 13A:
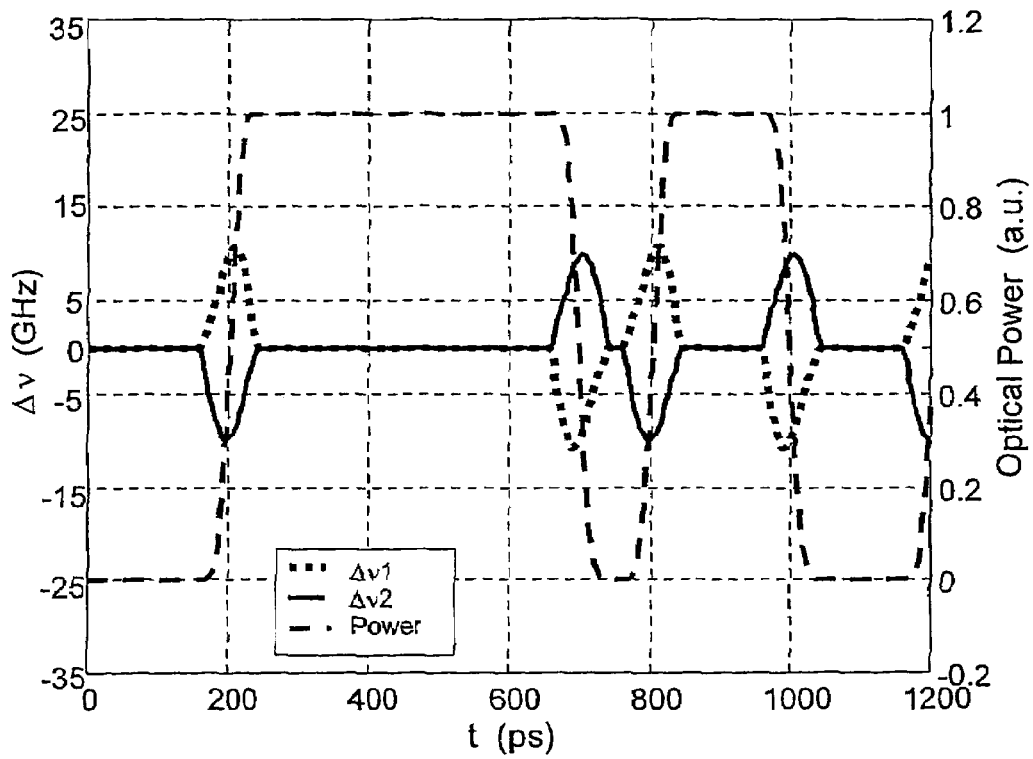
FIG. 13a shows the frequency variation $\Delta\nu$ (GHz) versus time (ps) undergone, in the optical modulator of the invention with the voltage configuration of FIG. 12, by the first optical light beam traveling through the first arm (dotted line) and by the second optical light beam traveling through the second arm (continuous line) and the optical power (in arbitrary units) of the output modulated optical light beam versus time (ps; dashed line)

FIG. 13a shows the frequency variation $\Delta\nu$ undergone by the first optical light beam traveling through the first arm 9 (dotted line) and by the second optical light beam traveling through the second arm 12 (continuous line) versus time. Moreover, it shows the optical power variation of the output modulated optical light beam (in arbitrary units) versus time (dashed line).

The peak to peak amplitude of the first and second modulation voltage and the first and second bias voltage are such that, similarly to the configuration of FIG. 8, the overall phase shift $\Delta\phi$ undergone by the first optical light beam traveling through the first arm 9 and by the second optical light beam traveling through the second arm 12 when the optical modulator passes from a "on" state to an "off" state, and vice versa, is the same in absolute value but opposite in sign (see FIG. 13a). In the optical modulator of the invention, due to the non-linear variation of the refractive index, the instantaneous phase shift $\Delta\phi$ (and the instantaneous frequency variation $\Delta\nu$), undergone by the light beams at each instant, is different. However, as it can be seen from FIG. 13a, the instantaneous frequency variations undergone by the first and second optical beams also in this configuration are very similar.

Indeed, a small-signal analysis performed by the Applicant on the modulator of the invention with the voltage configuration of FIG. 12 gave a 0.02 chirp (i.e., a substantially null chirp).

Figure 13B:
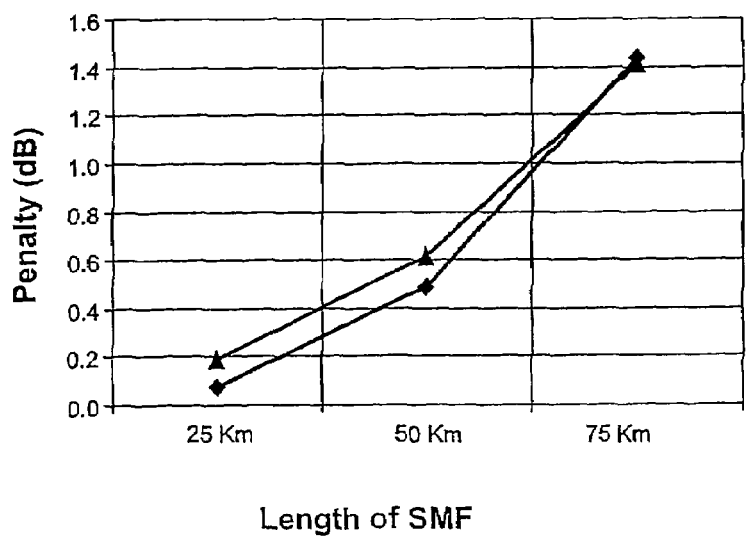
FIG. 13b shows the penalty versus fiber length computed in case of propagation in a standard single mode fiber (SMF) for an optical light beam modulated by the modulator of the invention having the voltage configuration of FIG. 12 (continuous line with rhombus) or by a conventional push-pull LiNbO$_3$ modulator having a chirp parameter equal to +0.1 ((continuous line with triangles)

Moreover, as shown in FIG. 13b, the Applicant compared through a system simulation the performance of this optical modulator of the invention with that of a conventional push-pull LiNbO$_3$ optical modulator, wherein the refractive index variation induced by Pockels effect is linear.

In particular, FIG. 13b shows the penalty versus fiber length computed in case of propagation in a standard single mode fiber (SMF) of an optical light beam modulated by the modulator of the invention according to the configuration of FIG. 12 (continuous line with rhombus) or by a conventional push-pull LiNbO$_3$ modulator having a chirp parameter equal to +0.1 (continuous line with triangles). The performances of the two modulators are comparable.

FIG. 10 shows a configuration adapted to obtain an output modulated light beam with a negative chirp.

According to this configuration, the driving circuit 80 of the optical modulator 1 supplies a CW voltage to the third electrode structure 22 such as to introduce an initial zero phase shift ($\Delta\phi_{in}=\phi2_{in}-\phi1_{in}=0$) between the optical path of the second arm 12 and the first arm 9. Moreover, the driving circuit 80 supplies to the first and second electrode structure 20, 21 modulation voltages having the same peak to peak amplitude and superimposed to different bias voltages ($V_{bias1}$ and $V_{bias2}$, respectively). More in particular, the modulation voltage superimposed to the first bias voltage varies between a minimum value of $V_0$ to which corresponds a phase $\phi_{RF1}$ of $\phi_0$ and a maximum value of $(V_0+V_{0+\pi})/2$ to which corresponds a phase $\phi_{RF1}$ of $[\phi_0+(\phi_0+\pi)]/2$. At the same time, the modulation voltage superimposed to the second bias voltage varies between a maximum value of $V_{0+\pi}$ to which corresponds a phase $\phi_{RF2}$ of $\phi_0+\pi$ and a minimum value of $(V_0+V_{0+\pi})/2$ to which corresponds a phase $\phi_{RF2}$ of $[\phi_0+(\phi_0+\pi)]/2$. The modulation voltages are supplied so that the minimum voltage is supplied to the first electrode structure 20 while the maximum voltage is supplied to the second electrode structure 21, and vice versa.

Therefore, the off state or "0" logic state is obtained when the minimum voltage $V_0$ is supplied to the first electrode structure 20 while the maximum voltage $V_{0+\pi}$ is supplied to the second electrode structure 21. That is, when the phase shift between the two optical paths is $\Delta\phi=\phi2-\phi1=(\phi_{RF2})-(\phi_{RF1})=(\phi_0+\pi)-(\phi_0)=\pi$.

By contrast, the on state or "1" logic state is obtained when the minimum voltage $(V_0+V_{0+\pi})/2$ is supplied to the second electrode structure 21 while the maximum voltage $(V_0+V_{0+\pi})/2$ is supplied to the first electrode structure 20. That is, when the phase shift between the two optical paths is $\Delta\phi=\phi2-\phi1=(\phi_{RF2})-(\phi_{RF1})=0$.

Figure 11A:
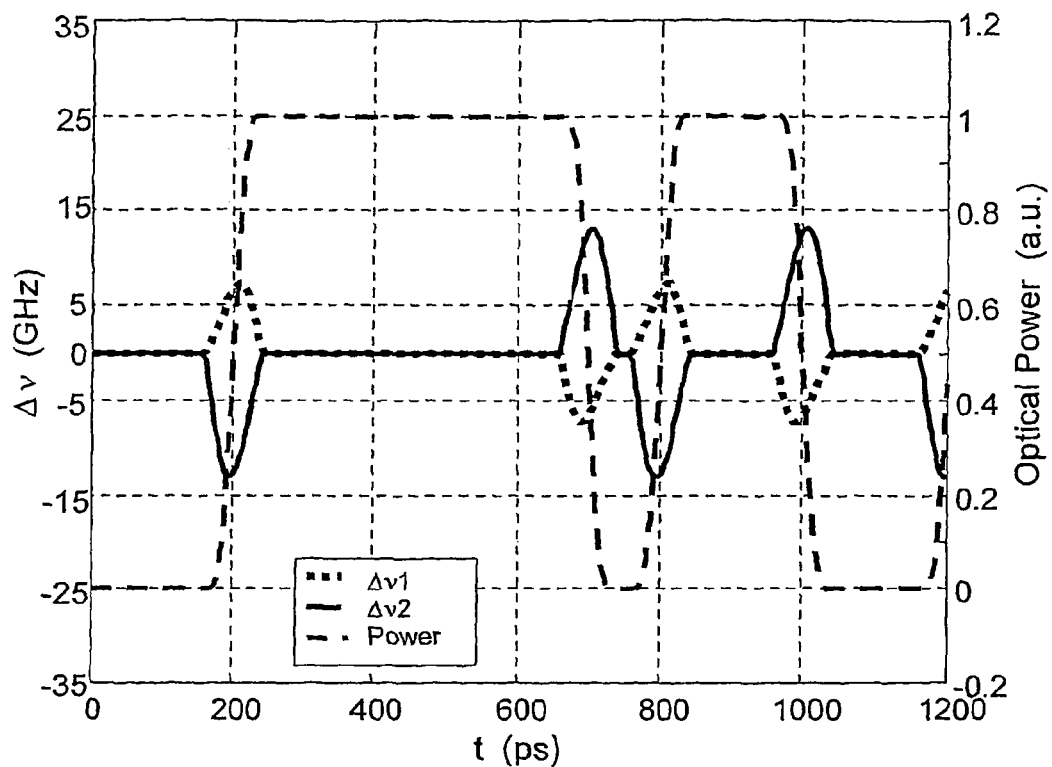
FIG. 11a shows the frequency variation $\Delta\nu$ (GHz) versus time (ps) undergone, in the optical modulator of the invention with the voltage configuration of FIG. 10, by the first optical light beam traveling through the first arm (dotted line) and by the second optical light beam traveling through the second arm (continuous line) and the optical power (in arbitrary units) of the output modulated optical light beam versus time (ps; dashed line)

Differently to the configurations of FIGS. 8 and 12, the peak to peak amplitude of the first and second modulation voltage and the first and second bias voltage are such that the overall phase shift $\Delta\phi$ (and the overall $\Delta\nu$ variation) undergone by the first optical light beam traveling through the first arm 9 and by the second optical light beam traveling through the second arm 12 when the optical modulator passes from a "on" state to an "off" state, and vice versa, is different both in absolute value and sign (see also FIG. 11a, that shows different instantaneous frequency variations undergone by the first and second optical beams).

Therefore, a chirped output modulated light beam is obtained. More in particular, for the configuration disclosed, a negative chirp equal to about −0.3 has been computed through a small-signal analysis.

Figure 11B:
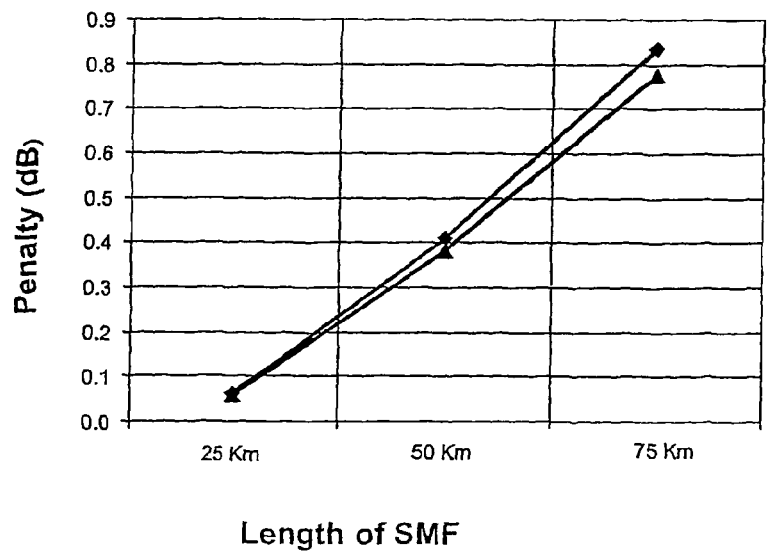
FIG. 11b shows the penalty versus fiber length computed in case of propagation in a standard single mode fiber (SMF) for an optical light beam modulated by the modulator of the invention having the voltage configuration of FIG. 10 (continuous line with rhombus) or by a conventional push-pull LiNbO$_3$ modulator having a chirp parameter equal to −0.3 (continuous line with triangles)

FIG. 11b shows the penalty versus fiber length computed through a system simulation in case of propagation in a standard single mode fiber (SMF) of an optical light beam modulated by the modulator of the invention according to the configuration of FIG. 10 (continuous line with rhombus) and by a conventional push-pull LiNbO$_3$ modulator having the same chirp parameter (continuous line with triangles).

The performances of the two optical modulators are comparable.

With the optical modulator 1 of the invention a predetermined desired value of chirp can be obtained by suitably selecting the initial conditions of the optical modulator, the bias voltages and the modulation voltages applied to the first and second electrode structure 20 and 21.

For example, a positive chirp of +0.3 can be obtained with the same configuration of FIG. 10 by changing the initial conditions so as to introduce an initial relative phase shift of π between the optical path of the two arms 9 and 12.

In order to characterize the modulator, a table can be formed containing the various CW, bias and modulation voltage values which allow predetermined chirp values to be obtained.

It is noted that in the optical modulator of the invention—wherein, at the working wavelength(s), the refractive index variation induced by Franz-Keldysh effect is non-linear and appreciable, the absorption coefficient is low and the absorption coefficient variation induced by Franz-Keldysh effect is negligible with the applied electric field—a desired value of chirp can be obtained with a Mach-Zehnder structure having waveguide arms of the same length, electrodes of the same length and symmetric optical splitter and combiner.

The optical modulator 1 of the invention can be used in an optical communication system for modulating the intensity of an input light beam according to the digital information to be transmitted through the system.

Figure 14:
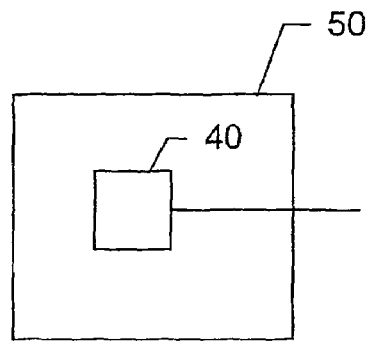
FIG. 14 shows a first embodiment of an optical transmitting station according to the invention.

FIG. 14 shows a first embodiment of an optical transmitting station 50 comprising a transmitter device 40.

Figure 15A:
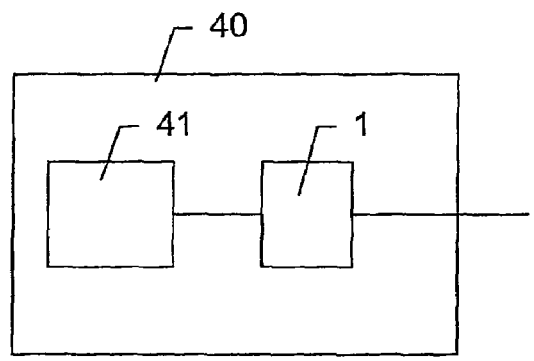
FIG. 15 shows a first embodiment (FIG. 15a) and a second embodiment (FIG. 15b) of a transmitter device according to the invention.

FIG. 15a shows a first embodiment of the transmitter device 40 comprising an optical source 41 for providing an optical light beam at a predetermined wavelength and an optical modulator 1 according to the invention to modulate the intensity of the optical light beam.

Advantageously, the optical source 41 is a conventional semiconductor laser.

Figure 15B:
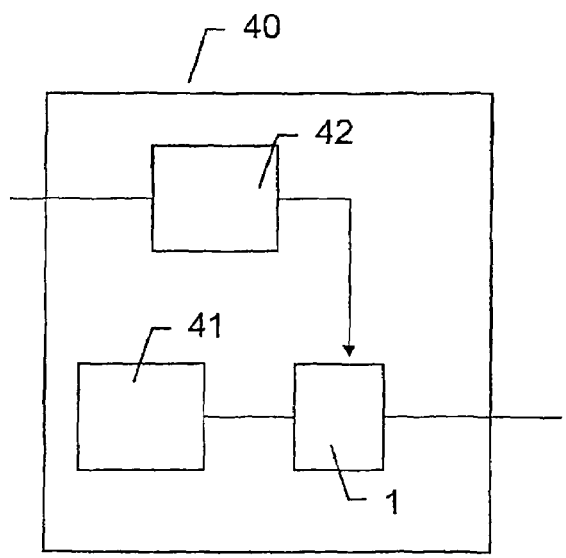

FIG. 15b shows another embodiment of the optical transmitter device 40 which differs from the embodiment of FIG. 15a in that it further comprises an electro-optical converter 42 adapted to convert an input modulated light beam at a generic wavelength into a corresponding modulation electric signal. The electro-optical converter 42 is coupled to the optical modulator 1 so as to supply said corresponding modulation electric signal to the driving circuit of the optical modulator 1. In this way the driving circuit drives the first and second electrode structure of the optical modulator 1 according to the modulation electric signal received by the electro-optical converter 42. This embodiment allows a modulated optical light beam having a generic wavelength to be converted into a modulated optical light beam having a predetermined desired wavelength.

The electro-optical converter 42 typically comprises a conventional photodiode, which can be realized with a group IV semiconductor material.

For example, the electro-optical converter 42 comprises a photodetector as disclosed by the document WO 04/001857.

The electro-optical converter 42 and the optical modulator 1 are advantageously integrated on the same silicon substrate.

Figure 16:
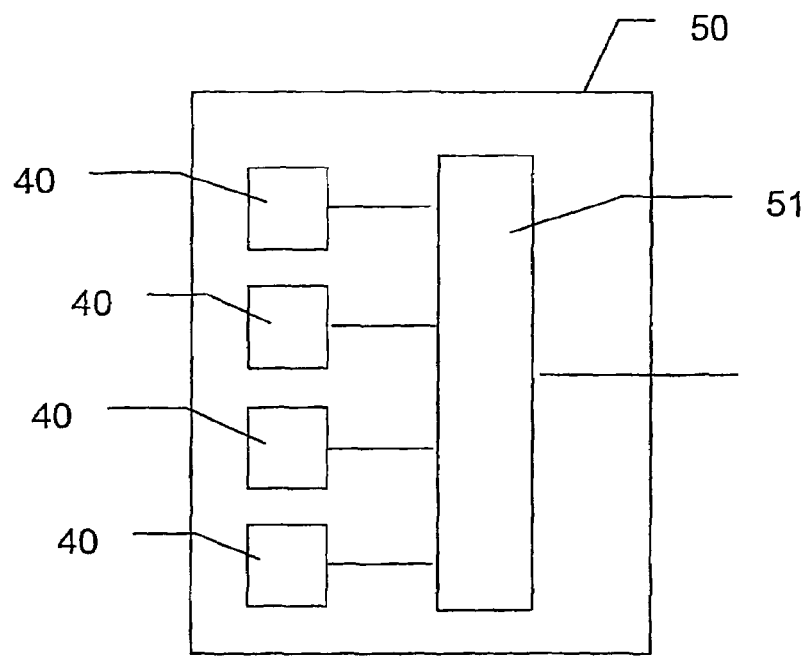
FIG. 16 shows a second embodiment of a transmitting station according to the invention.

FIG. 16 shows a second embodiment of the transmitting station 50 adapted for WDM transmission, comprising a plurality of optical transmitter devices 40 (according to the embodiments of FIG. 15a or 15b) for providing a corresponding plurality of modulated optical light beams at predetermined wavelengths different from each other and a conventional wavelength multiplexing device 51 for wavelength multiplexing the plurality of modulated optical light beams.

Figure 17:
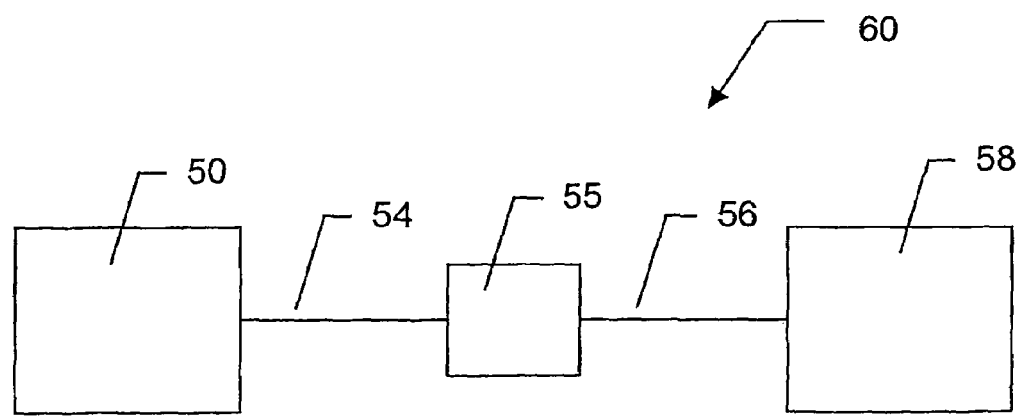
FIG. 17 shows an optical communication system according to the invention.

FIG. 17 shows an optical communication system 60 comprising the transmitting station 50, an optical fiber line comprising a first optical fiber span 54 and a second optical fiber span 56, an optical amplifier 55 between the first and the second optical fiber span 54, 56 and a receiving station 58.

Advantageously, the optical amplifier 55 comprises a conventional erbium-doped optical fiber amplifier.

The receiving station 58 is of the conventional type. It typically comprises a conventional photodiode for receiving the optical light beam from the second optical fiber span 56, converting it into a corresponding electric signal and supplying it to a suitable processing unit (not shown).

In the case of WDM transmission, the receiving station 58 typically comprises a conventional demultiplexer and a plurality of conventional photodiodes.

Moreover, in case of WDM transmission the optical line included in the communication system 60 may comprise an add-drop unit.

Figure 18:
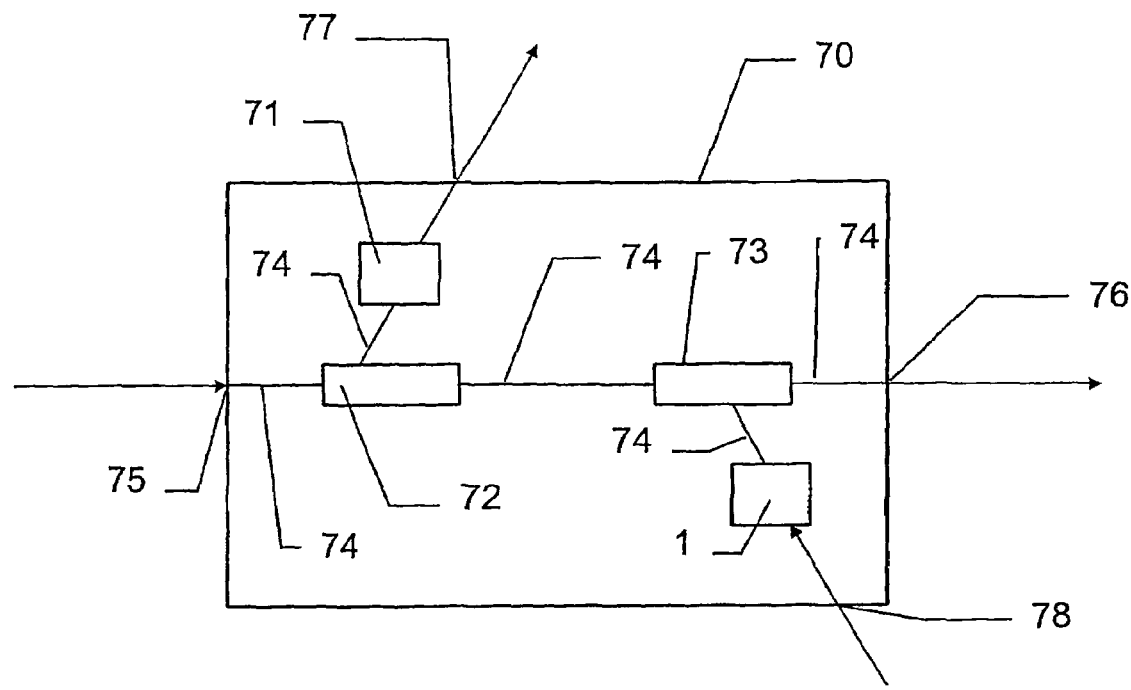
FIG. 18 shows an embodiment of a unit according to the invention.

FIG. 18 shows an add-drop unit 70 according to an embodiment of the invention.

The unit 70 comprises a first input 75, a first output 76, a second input 78, a second output 77, an optical modulator 1 according to the invention, an electro-optical converter 71, a drop filtering element 72, an add filtering element 73 and connecting waveguides 74.

In the embodiment shown, the unit 70 receives a WDM signal from the input 75. The drop filtering element 72 drops a light beam at a predefined wavelength from the WDM signal, supplies the dropped light beam to the electro-optical converter 71 and the rest of WDM signal to the add filtering element 73. The electro-optical converter 71 converts the dropped light beam into a corresponding electrical signal and supplies the electrical signal to the second output 77. The optical modulator 1 receives a CW light beam at a predefined wavelength from the second input 78, suitably modulates the intensity thereof and supplies it to the add filtering element 73. The latter adds the modulated light beam to the WDM signal and supplies the WDM signal thus modified to the second output 76.

The drop and add filtering elements 72, 73 are conventional filtering devices.

Although the add/drop functions have been shown to be carried out by separate elements 72, 73 in FIG. 18, it has to be understood that a single element (e.g. an interferential filter) may perform both functions.

The electro-optical converter 71 typically comprises a conventional photodiode fabricated in a group IV semiconductor material or a combination of group IV semiconductor materials.

For example, the electro-optical converter 71 comprises a photodetector as disclosed by the document WO 04/001857.

Advantageously, the drop filtering element 72, the add filtering element 73 and the connecting waveguides 74 are fabricated in a group IV semiconductor material, a combination of group IV semiconductor materials, $SiO_2$, doped $SiO_2$, $Si_3N_4$, SiON or a combination thereof.

Preferably, the optical modulator 1, the electro-optical converter 71, the drop filtering element 72, the add filtering element 73 and the connecting waveguides 74 are grown on the same silicon substrate during the production process of the unit. As stated above, this eliminates the need of alignment and gluing steps otherwise required during the assembling process of the various components of the unit and reduces the cost and the size of the unit.

The invention claimed is:
1. An optical modulator comprising:
a first and a second waveguide arm for receiving and transmitting therethrough first and second light beams, respectively;
a first and a second electrode structure associated with said first and second waveguide arms respectively; and
a driving circuit for supplying a voltage to said first and second electrode structures, said driving circuit being adapted to supply a first modulation voltage superimposed to a first bias voltage to the first electrode structure and a second modulation voltage superimposed to a second bias voltage to the second electrode structure, a peak to peak amplitude of the first modulation voltage being different from a peak to peak amplitude of the second modulation voltage.

2. The optical modulator according to claim 1, wherein the first and second waveguide arms are substantially of the same length.

3. The optical modulator according to claim 1, further comprising a third electrode structure associated with one of the first and second waveguide arms.

4. The optical modulator according to claim 3, wherein the driving circuit is adapted to supply to the third electrode structure a continuous wave voltage.

5. The optical modulator according to claim 1, wherein the driving circuit is adapted to supply the first and second modulation voltage as electric signals having the same waveform.

6. The optical modulator according to claim 5, wherein the driving circuit is adapted to supply the electric signals with inverted sign.

7. A transmitting station comprising an optical transmitter device, the optical transmitter device comprising an optical source for providing an optical light beam at a predetermined wavelength and an optical modulator according to claim 1, associated with the optical source to modulate the intensity of the optical light beam.

8. The transmitting station according to claim 7, wherein the optical transmitter device further comprises an electro-optical converter adapted to convert an input modulated light beam at a generic wavelength into a corresponding modulation electric signal, the electro-optical converter being coupled to the optical modulator so as to supply said corresponding modulation electric signal to the driving circuit of the optical modulator.

9. An optical communication system comprising a transmitting station according to claim 7, and an optical communication line having a first end coupled to the transmitting station.

10. The optical communication system according to claim 9, further comprising a receiving station coupled to a second end of the optical communication line.

11. An optical communication system comprising a transmitting station comprising:
an optical transmitter device wherein said optical transmitter device comprises an optical source for providing an optical light beam at a predetermined wavelength and an optical modulator according to claim 1, associated with the optical source to modulate the intensity of the optical light beam;
an electro-optical converter; and
an optical communication line having a first end coupled to the transmitting station,
the optical modulator and the electro-optical converter comprising a unit adapted to convert an input optical light beam into a corresponding electrical signal.

12. The optical modulator according to claim 1, further comprising:
an optical splitter for splitting an input light beam into the first and second light beams; and
an optical combiner connected to the first and second waveguide arms for combining the first and second light beams into the output light beam.

13. The optical modulator according to claim 12, wherein the first and second waveguide arms each comprise a core region comprising a group IV semiconductor material or a combination of group IV semiconductor materials.

14. The optical modulator according to claim 13, wherein the optical splitter is a symmetric splitter adapted to split the input light beam into the first and second light beams of substantially the same optical power.

15. The optical modulator according to claim 13, wherein the group IV semiconductor material of each core region is selected from the group of Si and Ge and a combination thereof.

16. The optical modulator according to claim 13, comprising a silicon substrate with said optical modulator integrated thereon.

17. A unit comprising:
an optical modulator comprising:
an optical splitter for splitting an input light beam into a first and a second light beam;
a first and a second waveguide arm connected to said optical splitter for receiving and transmitting therethrough said first and second light beams, respectively, said first and second waveguide arms each comprising a core region comprising a group IV semiconductor material or a combination of group IV semiconductor materials;
an optical combiner connected to said first and second waveguide arms for receiving said first and second light beams and combine said first and second light beams into an output light beam;
a first and a second electrode structure associated with said first and second waveguide arms respectively; and
a driving circuit for supplying a voltage to said first and second electrode structures,
said driving circuit being adapted to supply a first modulation voltage superimposed to a first bias voltage to the first electrode structure and a second modulation voltage superimposed to a second bias voltage to the second electrode structure, and
an electro-optical converter adapted to convert the input light beam into a corresponding electrical signal.

18. The unit according to claim 17, wherein the electro-optical converter is coupled to the optical modulator so as to supply the corresponding electrical signal to the driving circuit of the optical modulator.

19. The unit according to claim 17, further comprising a filtering element.

20. The unit according to claim 19, wherein the filtering element is coupled to the electro-optical converter.

21. The unit according to claim 19, wherein the filtering element is coupled to the optical modulator.

22. The unit according to claim 19, wherein the filtering element comprises a drop filtering element coupled to the electro-optical converter and an add filtering element coupled to the optical modulator.

23. The unit according to claim 17, wherein at least a portion of the electro-optical converter comprises a group IV semiconductor material or a combination of group IV semiconductor materials.

24. The unit according to claim 23, wherein the electro-optical converter and the optical modulator are integrated on a silicon substrate.

25. The unit according to claim 19, wherein the filtering element comprises a material selected from the group of a group IV semiconductor material, $SiO_2$, doped $SiO_2$, $Si_3N_4$, SiON and a combination thereof.

26. The unit according to claim 19, wherein the electro-optical converter, the optical modulator and the filtering element are integrated on a silicon substrate.

27. A method for modulating an intensity of an optical signal comprising the steps of:
   a) propagating first and second light beams along a first and a second optical path, respectively; and
   b) introducing through Franz-Keldysh effect a relative phase shift between the first and second optical paths so as to obtain an intensity modulation of an output light beam;
   wherein the step of introducing through the Franz-Keldysh effect is carried out by supplying a first modulation voltage superimposed to a first bias voltage to the first optical path and a second modulation voltage superimposed to a second bias voltage to the second optical path, a peak to peak amplitude of the first modulation voltage being different from a peak to peak amplitude of the second modulation voltage.

28. The method according to claim 27, further comprising supplying to at least one of the first and second optical paths a continuous wave voltage for introducing a further prefixed relative phase shift between the first and second optical paths.

29. The method according to claim 27, wherein a relative phase shift of $\pi$ or an integer odd multiple thereof is introduced for obtaining a 0 logic state and a relative phase shift of zero or an integer even multiple of iv is introduced for obtaining a 1 logic state.

30. The method according to claim 29, wherein the first and second modulation voltages are electric signals having the same waveform.

31. The method according to claim 30, wherein the electric signals have an inverted sign.

32. The method according to claim 31, wherein the first and second bias voltages and the first and second modulation voltages are such as to induce through the Franz-Keldysh effect an overall phase shift in the first and second optical paths which is substantially the same in absolute value but opposite in sign when passing from the 1 logic state to the 0 logic state, and vice versa.

33. The method according to claim 32, wherein the first bias voltage is substantially the same as the second bias voltage.

34. The method according to claim 32, wherein the first bias voltage is different from the second bias voltage.

35. The method according to claim 31, wherein the first and second bias voltages and the first and second modulation voltages are such as to induce through the Franz-Keldysh effect an overall phase shift in the first and second optical paths which is different in absolute value and sign, when passing from the 1 logic state to the 0 logic state, and vice versa.

36. The method according to claim 35, wherein the first bias voltage is different from the second bias voltage.

37. The method according to claim 27, comprising:
   splitting a light beam into the first and second light beams; and
   combining the first and second light beams into an output light beam after propagation along the first and second optical paths.

38. The method according to claim 37, wherein each of the first and second optical paths comprises a group IV semiconductor material or a combination of group IV semiconductor materials.

39. The method according to claim 38, wherein the light beam is split into the first and second light beams of substantially the same optical power.

40. A method for modulating an intensity of a light beam comprising the steps of:
   a) splitting the light beam into a first and a second light beam;
   b) propagating said first and second light beams along a first and a second optical path, respectively;
   c) combining said first and second light beam into an output light beam after propagation along the first and second optical paths; and
   d) introducing through Franz-Keldysh effect a relative phase shift between the first and second optical paths so as to obtain an intensity modulation of the output light beam;
   wherein the step of introducing through the Franz-Keldysh effect is carried out by supplying a first modulation voltage superimposed to a first bias voltage to the first optical path and a second modulation voltage superimposed to a second bias voltage to the second optical path,
   wherein in step d) a relative phase shift of $\pi$ or an integer odd multiple thereof is introduced for obtaining a 0 logic state and a relative phase shift of zero or an integer even multiple of $\pi$ is introduced for obtaining a 1 logic state,
   wherein the first and second modulation voltages are electric signals having the same waveform,
   wherein the electric signals have an inverted sign,
   wherein the first and second bias voltages and the first and second modulation voltages are such as to induce through the Franz-Keldysh effect an overall phase shift in the first and second optical paths which is substantially the same in absolute value but opposite in sign when passing from the 1 logic state to the 0 logic state, and vice versa,
   wherein the first bias voltage is different from the second bias voltage, and
   wherein a peak to peak amplitude of the first modulation voltage is different from a peak to peak amplitude of the second modulation voltage.

* * * * *

UNITED STATES PATENT AND TRADEMARK OFFICE
CERTIFICATE OF CORRECTION

PATENT NO.         : 8,149,492 B2                                    Page 1 of 1
APPLICATION NO.    : 10/593697
DATED              : April 3, 2012
INVENTOR(S)        : Ghidini et al.

It is certified that error appears in the above-identified patent and that said Letters Patent is hereby corrected as shown below:

At column 25, claim number 29, line number 28, please delete "iv" and insert --π--

Signed and Sealed this
Twenty-second Day of May, 2012

David J. Kappos
*Director of the United States Patent and Trademark Office*